(12) United States Patent
Joyce

(10) Patent No.: US 8,364,524 B2
(45) Date of Patent: Jan. 29, 2013

(54) USING PARTICIPATION TELEVISION TO FACILITATE ADVERTISING

(75) Inventor: James Christopher Joyce, New York, NY (US)

(73) Assignee: Sony Pictures Technologies Inc., Culver City, CA (US)

( * ) Notice: Subject to any disclaimer, the term of this patent is extended or adjusted under 35 U.S.C. 154(b) by 1167 days.

(21) Appl. No.: 11/954,118

(22) Filed: Dec. 11, 2007

(65) Prior Publication Data

US 2009/0037252 A1   Feb. 5, 2009

Related U.S. Application Data

(60) Provisional application No. 60/869,531, filed on Dec. 11, 2006, provisional application No. 60/915,231, filed on May 1, 2007.

(51) Int. Cl.
*G06Q 40/00*   (2012.01)
(52) U.S. Cl. .................. 705/14.1; 705/14.12; 705/14.13; 705/14.14; 705/14.19; 705/14.4; 705/14.41
(58) Field of Classification Search .................... 705/14, 705/14.1, 14.12, 14.13, 14.14, 14.19, 14.4, 705/14.41
See application file for complete search history.

(56) References Cited

U.S. PATENT DOCUMENTS

| | | | | |
|---|---|---|---|---|
| 5,537,143 A | * | 7/1996 | Steingold et al. | 725/119 |
| 7,448,058 B2 | * | 11/2008 | Heyner et al. | 725/9 |
| 7,624,038 B1 | * | 11/2009 | Wood et al. | 705/14.26 |
| 2004/0181818 A1 | * | 9/2004 | Heyner et al. | 725/146 |
| 2004/0187148 A1 | * | 9/2004 | Cassella | 725/35 |
| 2005/0239495 A1 | * | 10/2005 | Bayne | 455/550.1 |

* cited by examiner

*Primary Examiner* — Jagdish Patel
*Assistant Examiner* — Kevin Poe
(74) *Attorney, Agent, or Firm* — Frommer Lawrence & Haug LLP; William S. Frommer; Ellen Marcie Emas

(57) ABSTRACT

In some implementations, techniques are described for customer lead generation and fulfillment through viewer participation in television, cellular or mobile telephone, and Internet-enabled computer or computing device platforms. Participation television may be leveraged to identify potential consumers and advertising leads may be selected for the potential consumers. An exchange of information related to an advertisement, offer, or gift may be facilitated between an advertiser and a participant in a participation television segment.

20 Claims, 11 Drawing Sheets

USING PARTICIPATION TELEVISION TO FACILITATE ADVERTISING

CROSS REFERENCE TO RELATED APPLICATIONS

The present application claims priority to U.S. Provisional Application No. 60/869,531, filed Dec. 11, 2006, and U.S. Provisional Application No. 60/915,231 filed May 1, 2007, the contents of each are incorporated herein by reference in their entirety.

TECHNICAL FIELD

This disclosure relates to using participation television to facilitate advertising.

BACKGROUND

Television content providers broadcast content over a communication medium to many viewers and generate revenue by presenting advertisements in addition to the television content. Some television content providers provide participation television programming that enables viewers to engage and participate with the television programming.

SUMMARY

In one aspect, a computer system is configured to leverage participation television to facilitate advertising. The computer system includes a communication device configured to exchange communications during a communication session with a participant electronic device in response to a participant using the participant electronic device to participate in a participation television segment. The communication session relates to a participation television segment broadcast during television programming. The computer system also includes a participant identification device configured to automatically, without human intervention, identify the participant based on information received from the participant electronic device with which the participant used to establish the communication session, and a processing device. The processing device is configured to use the communication device to enable the participant to participate in the participation television segment broadcast during television programming based on the communication session, and select an incentive for the participant based on the participation television segment broadcast during television programming. The incentive is associated with an advertiser. The processing device is also configured to present, using the communication session with the participant electronic device, one or more communication methods with which the participant may communicate with the advertiser to redeem the incentive, and receive, using the communication session with the participant electronic device, a selection of at least one of the one or more communication methods with which the participant may communicate with the advertiser to redeem the incentive. The processing device is further configured to facilitate an exchange of information, using the selected at least one of the one or more communication methods, between the advertiser and the participant, the exchange of information being related to the incentive.

Implementations may include one or more of the following features. For example, the processing device may be configured to select the incentive by selecting at least one of an offer, a gift, and an advertisement. The processing device also may be configured to present, using the communication session with the participant electronic device, a direct mail communication method with which the participant receives, from the advertiser, information related to the incentive using direct mail, a scheduled return call communication method with which the participant receives information related to the incentive in a return call from the advertiser at a selected time, a credit card capture communication method with which the participant provides credit card information to enable the advertiser to process the offer using the credit card information, and a direct connect communication method with which the participant is directly connected with the advertiser to receive information related to the incentive using the communication session. The processing device may be configured to receive, using the communication session with the participant electronic device, a selection of at least one of the direct mail communication method, the scheduled return call communication method, the credit card capture communication method, and the direct connect communication method.

In some implementations, the processing device is configured to present, using the established communication session with the participant electronic device, a direct mail communication method with which the participant receives from the advertiser, information related to the incentive using direct mail, and receive, using the communication session with the participant electronic device, a selection of the direct mail communication method. In these implementations, the processing device may be configured to facilitate the exchange of information, using the selected at least one of the one or more communication methods, between the advertiser and the participant by identifying direct mail contact information for the participant, and providing the identified direct mail contact information to the advertiser to enable the advertiser to exchange information related to the incentive with the participant by direct mail.

In some examples, the processing device may be configured to present, using the communication session with the participant electronic device, a scheduled return call communication method with which the participant receives information related to the incentive in a return call from the advertiser at a selected time and receive, using the communication session with the participant electronic device, a selection of the scheduled return call communication method and a selection of a time with which the participant wishes to receive the return call. In these examples, the processing device may be configured to facilitate the exchange of information, using the selected at least one of the one or more communication methods, between the advertiser and the participant by identifying a telephone number for the participant, and providing, to the advertiser, the identified telephone number for the participant and the time with which the participant wishes to receive the return call to enable the advertiser to exchange information related to the incentive in a return call placed to the identified telephone number for the participant at the time with which the participant wishes to receive the return call.

The processing device may be configured to select an offer for the participant, present, using the communication session with the participant electronic device, a credit card capture communication method with which the participant provides credit card information to enable the advertiser to process the offer using the credit card information, and receive, using the communication session with the participant electronic device, a selection of the credit card capture communication method and credit card information. The processing device may be configured to facilitate the exchange of information, using the selected at least one of the one or more communication methods, between the advertiser and the participant by identifying contact information for the participant, and providing the credit card information and the identified contact information to the advertiser to enable the advertiser to process the offer using the credit card information and provide information related to the processed offer to the participant using the identified contact information.

In some implementations, the processing device may be configured to determine whether the communication session with the participant electronic device is a telephone call. Conditioned on determining that the communication session with the participant electronic device is a telephone call, the processing device may be configured to present, using the communication session with the participant electronic device, a direct connect communication method with which the participant is directly connected with the advertiser to receive information related to the incentive using the established telephone call, and receive, using the communication session with the participant electronic device, a selection of the direct connect communication method. In these implementations, the processing device may be configured to facilitate the exchange of information, using the selected at least one of the one or more communication methods, between the advertiser and the participant by transferring the established telephone call with the participant to a call center operated by the advertiser to enable the advertiser to exchange information related to the incentive using the transferred telephone call.

The processing device may be configured to enable the participant to participate in the participation television segment broadcast during television programming based on the communication session initiated by the participant by enabling the participant to participant in an interactive participation television segment that is broadcast during television programming and in which the participant may receive, from the advertiser, a prize, that is different than the incentive. The processing device also may be configured to enable the participant to participate in the participation television segment subsequent to receiving, using the communication session with the participant electronic device, the selection of at least one of the one or more communication methods with which the participant may communicate with the advertiser to redeem the incentive. The processing device further may be configured to enable the participant to participate in the participation television segment conditioned on the participant agreeing to receive information, from the advertiser, related to the incentive.

In some examples, the computer system includes a demographic information data store configured to store demographic information associated with potential participants of the participation television segment. In these examples, the processing device may be configured to access, from the demographic information data store, demographic information associated with the participant based on the identification performed by the participant identification device, analyze the demographic information associated with the participant, and select the incentive for the participant based on the analysis of the demographic information associated with the participant.

The processing device may be configured to enable the participant to participate in the participation television segment by receiving an answer, provided by the participant over the communication session with the participant electronic device, to a question presented during the participation television segment broadcast during television programming. The processing device also may be configured to select the incentive for the participant based on the analysis of the demographic information associated with the participant and the participant's answer to the question presented during the participation television segment broadcast during television programming. The processing device further may be configured to store, in the demographic information data store, the participant's answer to the question presented during the participation television segment broadcast during television programming. In response to the participant initiating, using the participant electronic device, a subsequent communication session based on a subsequent participation television segment broadcast during television programming subsequent to the participation television segment, the processing device may be configured to access, from the demographic information data store, the participant's answer to the question presented during the participation television segment broadcast during television programming, and select a subsequent incentive for the participant for the subsequent participation television segment based on the participant's answer to the question presented during the participation television segment.

In some implementations, the advertiser may be an entity other than an entity operating the processing device and the advertiser may compensate the entity operating the processing device for facilitating the exchange of information between the advertiser and the participant. The communication device may be configured to establish the communication session with the participant electronic device in response to the participant initiating, using the participant electronic device, the communication session. The communication session may occur while the participation television segment is broadcast during television programming.

The communication device also may be configured to establish the communication session with at least one of a landline telephone, a cellular telephone, a personal computer, and a personal digital assistant and the communication session may include at least one of a short message service (SMS) communication session, a telephone call, a network communication session, and an instant messaging communication session. The participation television segment broadcast during television programming may be associated with main television programming being broadcast and may include an actor from the main television programming. The participation television segment broadcast during television programming may be commercial television programming other than main television programming being broadcast.

In some examples, the participant identification device may be configured to automatically identify the participant based on at least one of automatic number identification (ANI) data, dialed number identification service (DNIS) data, a telephone number, and an Internet protocol (IP) address. The participant identification device also may be configured to access data from a third party information source and automatically identify a name and address of the participant based on the accessed third party information.

In another aspect, participation television is leveraged to facilitate advertising. Communications are exchanged during a communication session with a participant electronic device in response to a participant using the participant electronic device to participate in entertainment programming. The communication session relates to the entertainment programming. The participant is automatically identified, without human intervention, based on information received from the participant electronic device with which the participant used to establish the communication session, the participant is enabled to participate in the entertainment programming based on the communication session initiated by the participant. A sponsor is selected for the participant based on the participant's participation in the entertainment programming, and one or more communication methods with which the participant may communicate with the sponsor are presented using the communication session with the participant electronic device. Using the communication session with the participant electronic device, a selection of at least one of the one or more communication methods with which the participant may communicate with the sponsor is received, and an exchange of information is facilitated, using the selected at least one of the one or more communication methods, between the sponsor and the participant.

In yet another aspect, participation television is leveraged to provide a participant with an interactive television experience in which the participant may receive a prize from an advertiser. Communications associated with a participation television segment broadcast during television programming are received from multiple participants. The multiple participants are enabled to participate in the participation television segment broadcast during television programming based on the communications associated with the participation television segment received from the multiple participants, and the multiple participants are provided with information related to an incentive associated with an advertiser based on the communications associated with the participation television segment received from the multiple participants. A participant is selected, from among the multiple participants, to participate in an interactive television experience in which the participant may receive, from the advertiser, a prize that is different than the incentive. An interactive communication session is established with a participant electronic device associated with the selected participant. The interactive communication session is configured to enable the selected participant to send and receive communications with at least one actor associated with the participation television segment. Using the interactive communication session, the selected participant is enabled to participate in an interactive television segment between the selected participant and the at least one actor associated with the participation television segment, and it is determined whether the selected participant receives the prize from the advertiser based on participation in the interactive television segment. Award of the prize from the advertiser is handled based on determination results, and broadcast of the interactive television segment is facilitated during television programming.

Implementations may include one or more of the following features. For example, the selected participant may be enabled to participate in a live interactive television segment between the selected participant and the at least one actor associated with the participation television segment. The live interactive television segment may occur during a time period associated with main television programming in which the participation television segment was broadcast. Broadcast of the live interactive television segment may be facilitated during the time period associated with main television programming in which the participation television segment was broadcast. The interactive television segment may be associated with the main television programming being broadcast and may include an actor from the main television programming.

In some implementations, the selected participant may be enabled to participate in a game associated with the participation television segment, and it may be determined whether the selected participant receives the prize from the advertiser based on participation in the game associated with the participation television segment. In these implementations, the prize may be awarded to the participant conditioned on determining that the participant met one or more criteria defined by the game associated with the participation television segment. It may be determined not to award the prize to the participant conditioned on determining that the participant did not meet one or more criteria defined by the game associated with the participation television segment.

In some examples, the selected participant may be enabled to answer one or more questions corresponding to main television programming in which the participation television segment was broadcast. In these examples, it may be determined whether the selected participant correctly answered the one or more questions corresponding to the main television programming in which the participation television segment was broadcast.

Implementations of the described techniques may include hardware, a method or process, or computer software on a computer-accessible medium. The details of one or more implementations are set forth in the accompanying drawings and the description below. Other features will be apparent from the description and drawings.

DETAILED DESCRIPTION

Figure 1:
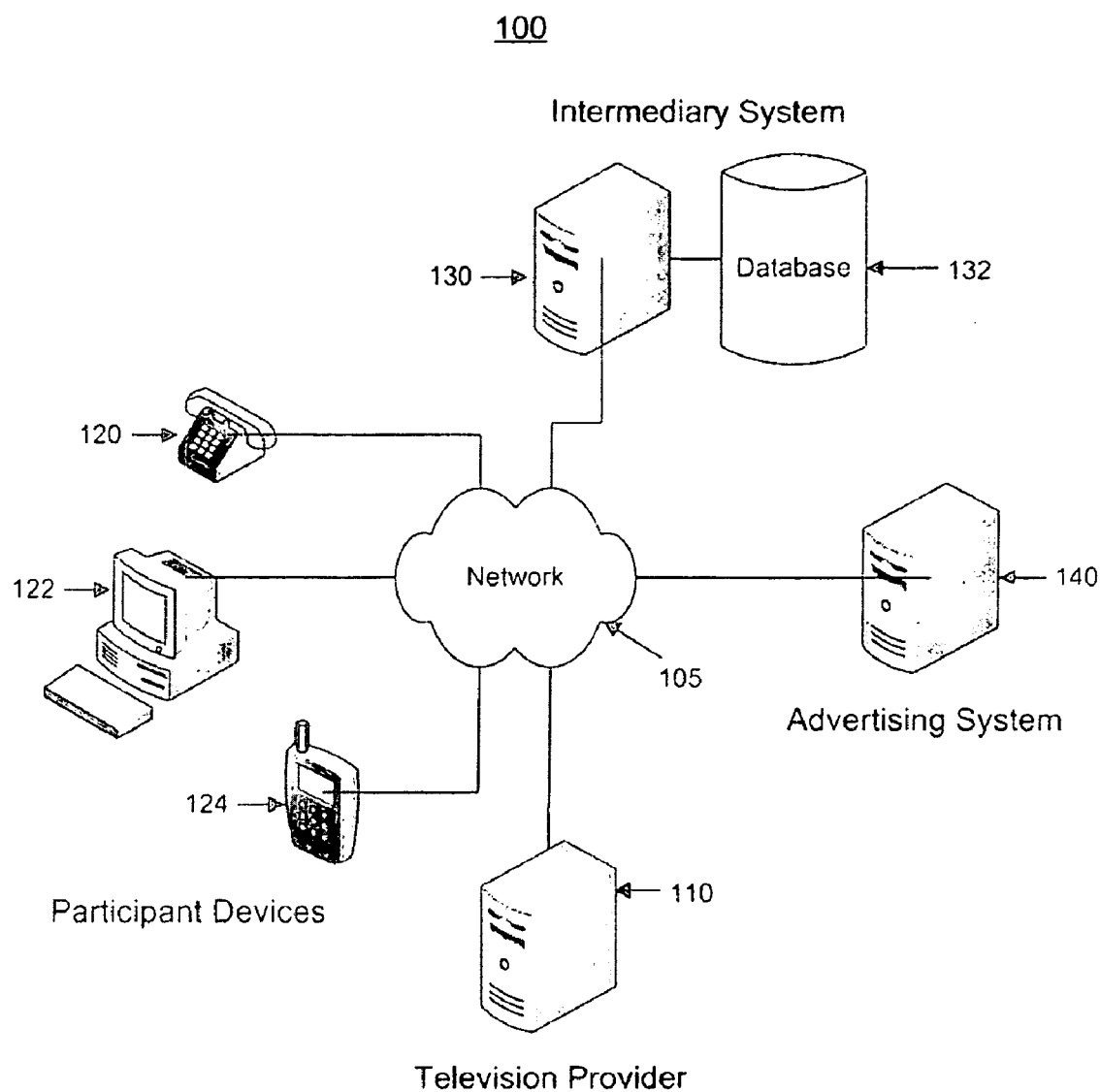
FIG. 1 is a block diagram of an example system configured to leverage participation television to provide automatic advertising lead generation or fulfillment of advertising leads.

Techniques are described for converting viewers of video entertainment programming on television, cellular phones, Internet-enabled personal computers and Internet-enabled mobile devices capable of displaying video into customers of advertisers. These techniques generally may be referred to as "participation television" although in some implementations entertainment methods and devices other than broadcast television or television sets may be used. Participation television may help increase the interest of viewers in a particular television program by offering viewers experiences in interacting with the particular television program while viewing the particular television program.

In general, a viewer of an entertainment program may become a direct customer of an advertiser as a result of participating in an entertainment experience related to the entertainment programming that occurs during or proximate to viewing the entertainment programming, which may be referred to as converting a viewer to a customer of an advertiser. For example, an advertiser may be a sponsor of the entertainment program or the interaction experience offered to viewers. The advertiser may sponsor one or more advertisements broadcast during the entertainment program, though this need not necessarily be so. More particularly, for example, during presentation of video entertainment content, viewers receive a request to participate in a quiz, question, or game, which is typically related to the entertainment content. The entertainment content may be short and/or long form video entertainment content. In some implementations, the entertainment content may be presented as audio only, such as broadcast or streamed radio received by a radio receiver, a mobile audio player, Internet-enabled personal computers, and Internet-enabled mobile audio devices capable of displaying video. The participation session may include a prize or prizes as an incentive for a viewer to participate. In some implementations, every participant receives a gift or incentive from an advertiser. The gift or incentive may help to create the context for advertiser follow-up and fulfillment with the viewer, which may enable, encourage or help cause the viewer to become a customer of the advertiser. This may be referred to as promoting customer acquisition. The gift or incentive may help to create content for advertiser follow-up and fulfillment, for example, by obtaining viewer contact information for follow-up by an advertiser representative or agent or by providing an incentive for future viewer contact with the advertiser (such as when a discount, gift or other type of redeemable incentive is provided to the viewer which requires the viewer to contact the advertiser to use the incentive). The participation session may help create brand and product awareness for advertisers. In a more particular example, a participation session also may include calling a registered participant on the phone number that the participant used to register for the participation session and transferring the call with the participant into a live studio broadcast to give an answer or solution to win a prize or otherwise provide the participant with a gift, reward or another type of incentive for participating.

FIG. 1 illustrates an example of a system 100 configured to leverage participation television to provide advertising lead generation or fulfillment or advertising leads. The system 100 includes a network 105, a television provider 110, multiple participant devices 120-124, an intermediary system 130, and an advertising system 140. The network 105 facilitates communications between the television provider 110, the multiple participant devices 120-124, the intermediary system 130, and the advertising system 140.

The network 105 is configured to enable exchange of electronic communications between devices connected to the network 105. For example, the network 105 may be configured to enable exchange of electronic communications between the television provider 110, the multiple participant devices 120-124, the intermediary system 130, and the advertising system 140. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway. The network 105 may include a circuit-switched network, a packet-switched data network, or any other network able to carry electronic communications. For example, the network 105 may include networks based on the Internet protocol (IP) or asynchronous transfer mode (ATM).

The television provider 110 includes one or more electronic devices configured to distribute signals including audio and video content to devices connected to the network 105. For example, the television provider 110 may be configured to broadcast television programming to the multiple devices over the network 105. The television provider 110 may be configured to broadcast television or other audio and video programming using a variety of communication mechanisms. For instance, the television provider 110 may be configured to broadcast ultra high frequency (UHF) or very high frequency (VHF) television signals from a television transmitter tower, transmit television content from a transmitter to a satellite for transmission to receiving satellite dishes, or provide television programming directly to participant devices over a cable communications link or an IP-based network. The television provider 110 may be configured to communicate with the intermediary system 130 and the advertising system 140 for advertising and control purposes. The television provider 110 may be configured to provide interactive programming in which viewers may interact with the television programming broadcast by the television provider 110. In some implementations, the television provider 110 may broadcast, stream or otherwise distribute entertainment content over distribution channels other than broadcast, cable or satellite television channels. For convenience, the term "television program" or "television content" is used to describe various forms of interactive video content, which may be distributed through various distribution channels, including channels other than broadcast, cable or satellite television channels.

The participant devices 120-124 each may be any type of electronic device configured to exchange communications with devices connected to the network 105. The multiple participant devices 120-124 may be configured to exchange communications with the television provider 110, the intermediary system 130, and the advertising system 140. In some examples, the multiple participant devices 120-124 may be general-purpose computers (e.g., desktop personal computers, workstations, or laptop computers) that are configured to communicate with the intermediary system 130 over the network 105. The multiple participant devices 120-124 also may be mobile or wireless devices or devices designed for a specific function. For instance, the multiple participant devices 120-124 may include a cell phone, a smart phone, a tablet PC, a personal digital assistant ("PDA"), or any other portable device configured to communicate over a network. Implementations also may include mobile electronic mail or text messaging devices, electronic organizers, portable music players, portable video players, other types of devices, and handheld or portable electronic devices for entertainment, gaming, communications, and/or data organization. In some configurations, the multiple participant devices 120-124 may include a landline telephone configured to place and receive telephone calls over the PSTN. Although FIG. 1 illustrates three participant devices for brevity, actual implementations may include more (and, perhaps, many more) or fewer participant devices.

The intermediary system 130 includes one or more electronic devices (e.g., servers, other types of general purpose computers, special purpose computers, etc.) configured to assist in leveraging participation television for advertising purposes by exchanging electronic communications with the multiple participant devices 120-124 over the network 105. For example, the intermediary system 130 may be configured to receive telephone calls, text or short message service (SMS) messages, electronic mail messages, instant messages, or any other type of electronic messages from the multiple participant devices 120-124 over the network 105. The communications may be sent from the multiple participant devices 120-124 in response to participation/interactive television programming broadcast by the television provider 110. For instance, a viewer watching participation television programming broadcast by the television provider 110 may use one of the multiple participant devices 120-124 to communicate with the intermediary system 130 based on the participation television programming.

The intermediary system 130 may be configured to communicate with the television provider 110 to enable the display or broadcast of the results of participation of the multiple participant devices 120-124 in the participation television segment. For instance, the intermediary system 130 may be configured to communicate poll results, contest results, or other types of participation television results to the television provider 110 for broadcast. The intermediary system 130 also may be configured to arrange a live participation television experience for a viewer using one of the multiple participant devices 120-124. For example, the intermediary system 130 may record an audio or audiovisual exchange with a viewer and provide the recorded exchange to the television provider for real-time or later broadcast. In another example, the intermediary system 130 may transfer a communication session established with one of the multiple participant devices 120-124 to the television provider 110 to enable the television provider 110 to interact with a viewer directly.

In some implementations, the intermediary system 130 may be configured to communicate with the advertising system 140 to facilitate advertising lead generation or fulfillment. For instance, the intermediary system 130 may be configured to provide, to the advertising system 140, communication information for a viewer contacting the intermediary system 130 to participate in a participation television segment. The communication information may be used by the advertising system 140 to contact the viewer regarding an offer, gift, or other type of advertisement provided by the advertising system 140. The intermediary system 130 also may transfer a communication session established with one of the multiple participant devices 120-124 to the advertising system 140 to enable the advertising system 140 to interact with a viewer directly.

The intermediary system 130 further may be configured to communicate with a database 132 to store and retrieve information used in leveraging participation television for advertising purposes. The intermediary system 130 may communicate with the database 132 using any appropriate protocol. For example, the intermediary system 130 may communicate with the database 132 over a dedicated connection, a network other than the network 105 (e.g., a local area network of a company implementing the intermediary system 130 and the database 132), or the network 105.

The database 132 may be one or more locally or remotely accessible storage devices configured to store information used in leveraging participation television for advertising purposes. The database 132 may include one or more storage or memory devices configured to store electronic data. The storage or memory devices may be configured to store data using, for example, magnetic, optical, or solid state technologies. Although the database 132 is shown as being separate from the intermediary system 130, the database 132 may be part of the intermediary system 130. The database 132 may include a relational database, an object-oriented database, a file storage system (such as for storing XML or another type of data file), or another type of data store technology.

The database 132 is configured to store information used in leveraging participation television for advertising purposes. For example, the database 132 may store information related to advertisers and advertisements offered by the intermediary system 130. In this example, the advertising information may include preferred methods of contacting advertisers, details of offers or gifts being offered by advertisers, and details related to preferred customers or customer types for particular advertisements or advertisers. The advertising information may be used to select an appropriate advertisement for a particular viewer and provide the viewer with details of the advertisement.

The database 132 also may store potential participant information. The potential participant information may include information used to identify participants contacting the intermediary system 130 to participate in participation television. For instance, the potential participant information may include names, usernames, telephone numbers, IP addresses, or other identifying information associated with potential participants or participant devices (e.g., the participant devices 120-124) used by participants to contact the intermediary system 130. The potential participant information also may include demographic information for potential participants. The demographic information may be used to select an advertisement, offer, or gift for an identified participant. The selected advertisement, offer, or gift may be targeted to the interests of the identified viewer or may be offered by an advertiser targeting viewers with characteristics corresponding to characteristics of the identified viewer (e.g., gender, age, geographic location, household income, etc.).

The advertising system 140 may include one or more electronic devices configured to communicate with the intermediary system 130 and the multiple participant devices 120-124 over the network 105. For example, the advertising system 140 may communicate with the intermediary system 130 to receive information related to potential consumers to which the advertising system may offer an advertisement. In this example, the intermediary system 130 may provide potential customer contact information (e.g., telephone number, electronic mail address, physical mailing address, etc.) to the advertising system 140 and the advertising system 140 or the advertiser operating the advertising system 140 may contact the potential customer using the contact information.

In some implementations, the advertising system 140 may establish a communication session with one of the multiple participant devices 120-124 transferred from the intermediary system 130. For instance, the advertising system 140 may include a call center and the intermediary system 130 may transfer a call established with one of the multiple participant devices 120-124 for participation television to the call center included in the advertising system 140. Based on the transferred call, an operator of the call center may communicate with the potential customer directly and make an offer to potential customer.

The advertising system 140 may be associated with a manufacturer, an online retailer, a brick and mortar retail store, or any other entity providing offers, gifts, or advertisements. Although FIG. 1 illustrates a single advertising system for brevity, actual implementations may include more (and, perhaps, many more) advertising systems offering different advertisements for different retailers or manufacturers. In addition, in some implementations, the television provider 110, the intermediary system 130, and the advertising system 140 may not be separate systems. For example, in some implementations, the intermediary system 130 performs the functions of the advertising system 140 and directly fulfills advertising leads. In other examples, the television provider 110 performs the functions of the intermediary system 130.

Figure 2:
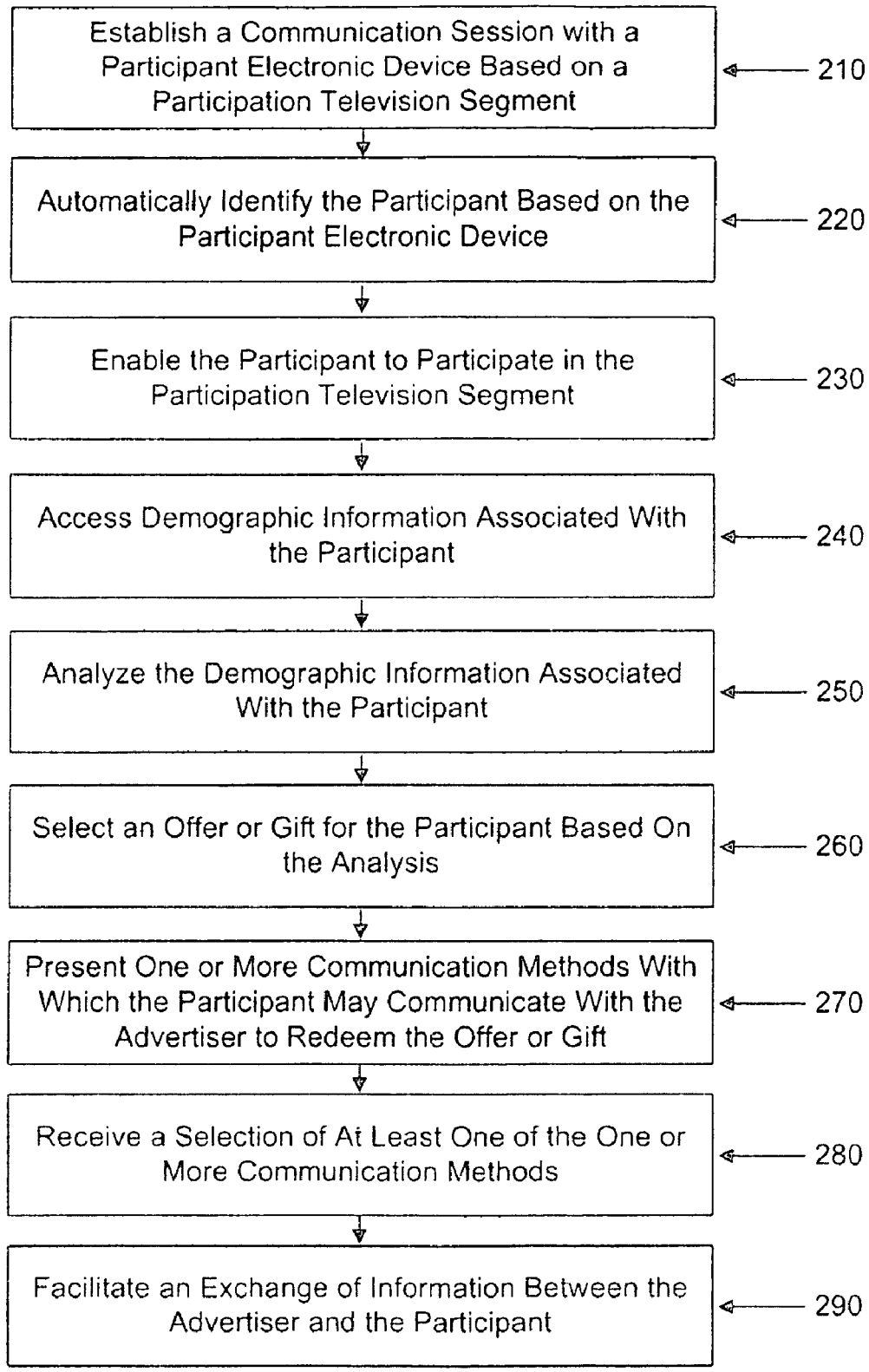
FIG. 2 is a flow chart of an example of a process for leveraging participation television to provide automatic advertising lead generation or fulfillment of advertising leads.

FIG. 2 depicts a process 200 for leveraging participation television to provide automatic advertising lead generation or fulfillment of advertising leads. For convenience, particular components described with respect to FIG. 1 are referenced as performing the process 200. However, similar methodologies may be applied in other implementations where different components are used to define the structure of the system, or where the functionality is distributed differently among the components shown by FIG. 1.

The intermediary system 130 establishes a communication session with a participant electronic device (e.g., one of the multiple participant devices 120-124) based on a participation television segment broadcast by the television provider 110 (210). For example, the intermediary system 130 receives a telephone call, a text or SMS message, an electronic mail message, an instant message, an IP-based communication generated based on interaction with a user interface, or any other type of electronic communication from one of the multiple participant devices 120-124. A viewer viewing a participation television segment may be able to participate in the participation television segment using the communication session with the intermediary system 130. In some implementations, a viewer may provide an answer to a poll question or enter a contest associated with television programming by conveying an answer or an entry to the intermediary system 130. In these implementations, the viewer may convey the answer or entry to the intermediary system 130 in a telephone call, a text or SMS message, an electronic mail message, an instant messaging communication, or another type of communication. The contact information for use in conveying the answer or entry to the intermediary system 130 may have been provided during broadcast of the participation television segment.

The participation television segment may include an invitation for a viewer of the participation television segment to initiate a communication session with the intermediary system. For instance, the participation television segment may include a message asking a viewer to call a telephone number to participate in the participation television segment or may include a message asking a viewer to place a text or SMS message to a particular number. The communication session may be established during or after broadcast of the participation television segment. In some implementations, viewers may establish a communication session during the participation television segment. In these implementations, viewers may initiate a communication session as soon as a participation television segment is broadcast and establish the communication session during broadcast of the participation television segment. The viewer may participate or interact with the participation television segment based on the content included in the participation television segment while the participation television segment is being broadcast. For example, the participation television segment may ask a series of questions and the viewer may provide, using the communication session, an answer to each question as the question is broadcast in the participation television segment. For communication sessions established during broadcast of the participation television segment, the communication sessions may be established before broadcast of the participation television segment (e.g., viewers may call a telephone number in advance of the segment) and may persist after broadcast of the participation television segment.

In other implementations, the viewers may establish a communication session after broadcast of the participation television segment. In these implementations, the participation television segment may ask the viewers to initiate a communication session immediately after broadcast of the participation television segment, may ask viewers to initiate a communication session within a particular amount of time after broadcast of the participation television segment, or may ask viewers to initiate a communication session at a specific time after broadcast of the participation television segment.

The participation television segment may be associated with main television programming being provided by the television provider 110 or may be part of commercial programming. For example, the participation television segment may be produced by the entity producing the main television programming and may be used to supplement the main television programming. In this example, the participation television segment may be a poll question or trivia question associated with the main television programming. Actors from the main television programming may be included in the participation television segment and may interact with viewers based on participation in the participation television segment.

In other examples, the participation television segment may be produced by an entity (e.g., the intermediary system 130) other than the entity producing the main television programming and may be provided as commercial programming. In these examples, the participation television segment may not be related to the main programming and may be broadcast to encourage viewers to watch commercial programming. The participation television segment may involve actors that are different than the actors in the main television programming.

The participation television segment may be a game show type segment in which viewers may participate to win prizes. The participation television segment also may be a viewer commentary segment in which viewers offer comments or thoughts related to television programming. Results of the participation television segment may be displayed during live television programming or may be displayed at a later date or time (e.g., later during the same television program on the same day, later during a different television program, or later during an airing of the same television program on another day (e.g., next week's show).

The intermediary system 130 automatically identifies the participant based on the participant electronic device with which the participant used to establish the communication session (220). For example, when the intermediary system 130 receives a telephone call from the participant electronic device, the intermediary system 130 may identify the participant electronic device by using automatic number identification (ANI) or Dialed Number Identification Service (DNIS). In some configurations, the intermediary system 130 may identify the participant electronic device based on an IP address associated with the participant device used to contact the intermediary system 130. The intermediary system 130 also may be able to identify the participant electronic device or the participant based on a name, username, an electronic mail address, or other identifying information gleaned from communications with the participant electronic device. The intermediary system 130 may identify a participant associated with an identified participant device by accessing correlation information from the database 132 that correlates participants with participant electronic devices and comparing the identified participant device with the correlation data. Automatically identifying the participant may be based on information received from the participant device and may occur without human intervention. Automatic identification may occur based on device information received for the participant device (e.g., telephone number, IP address, etc.) or may occur based on information received in a communication session with the participant device (e.g., data received over the communication session, such as IVR commands based on keypad input or voice recognition, text data included in a text message, SMS message, email message, instant message, etc., or any other type of data that may be used to identify participants).

The intermediary system 130 enables the participant to participate in the participation television segment broadcast during television programming based on the communication session initiated by the participant (230). For instance, the intermediary system 130 enables the participant to provide an answer to a poll question, enter a contest, engage in a live participation segment, or otherwise participate in the participation television segment based on the communication session initiated by the participant. In some examples, the intermediary system 130 may receive an answer to a poll question or enter a contest by sending an SMS message or an electronic mail message including the answer or entry to the intermediary system 130. In these examples, the intermediary system 130 may not send a return message to the participant electronic device, may send a confirmation message indicating receipt of the answer or entry, or may send a follow up message that requests additional information from the participant. The intermediary system 130 may send a message using the same or a different communication method than the method used by the participant electronic device to contact the intermediary system 130. The intermediary system 130 also may establish a telephone call or an instant messaging session with the participant electronic device to exchange multiple real-time communications with the participant as part of participating in the participation television segment. The intermediary system 130 may communicate with the television provider 110 to enable the television provider 110 to broadcast the results of the participation television segment.

The intermediary system 130 accesses demographic information associated with the participant based on the identification of the participant or participant electronic device (240). In some implementations, the intermediary system 130 accesses the demographic information from the database 132. The demographic information may correspond to a particular potential customer or may correspond to a participant electronic device that is used by more than one participant. The demographic information may relate to information collected by the intermediary system 130 or information collected by third parties. The demographic information may be based on past purchases made by the participant or may be based on information known about a participant (e.g., information provided by a user profile, a survey, user account information, etc.). The demographic information may relate to household demographic information and may be obtained for a household using a name of the participant and the zip code of the participant. The demographic information may include past purchasing information for members of the household.

The intermediary system 130 analyzes the demographic information associated with the participant (250). For example, the intermediary system 130 analyzes the demographic information to identify characteristics of the participant. In this example, the intermediary system 130 may analyze the demographic information associated with the participant to determine an age of the participant, a gender of the participant, a geographic location associated with the participant, an income level associated with the participant, one or more interests of the participant, or any other information that may be relevant to selecting an advertisement, offer, or gift for the participant.

The intermediary system 130 selects an offer or gift for the participant based on the analysis (260). The intermediary system 130 may identify an offer or gift that corresponds to the characteristics or interests of the participant. For instance, the intermediary system 130 may compare the demographic information of the participant with information related to available offers or gifts and select an appropriate offer or gift based on the comparison. The selected other or gift may be an offer or gift that the intermediary system 130 predicts the participant will like or may be an offer or gift that an advertiser identified as wanting to present to people with characteristics or interests similar to those of the participant.

In some implementations, the intermediary system 130 may analyze the participant's interaction with the participation television segment to select an advertisement, offer, or gift. For example, when the participant responds to a poll question as part of participating in the participation television segment, the intermediary system 130 may analyze the participant's answer to the poll question in selecting the advertisement, offer, or gift. For example, if the pool question relates to the participant's favorite sports team, the participant may receive a first advertisement, offer, or gift if the participant selects a first sports team and may receive a second, different advertisement, offer, or gift if the participant selects a second, different sports team. The intermediary system 130 may store information related to the participant's interactions with participation television segments (e.g., in which segments the participant participates and how the participant participates in those segments) in the database 132 and uses the stored information related to the participant's interactions with participation television segments to select advertisements, offers, or gifts for subsequent participation television segments. As the participant participates in more participation television segments, more information may exist for the participant and the intermediary system 130 may be able to better select an advertisement, offer, or gift for the participant.

In further implementations, the intermediary system 130 selects an offer or gift for the participant based on general demographic information associated with typical viewers of television programming being broadcast in association with the participation television segment. For example, an administrator may assign particular offers or gifts to a particular participation television segment based on known demographic information of typical viewers of television programming being broadcast in association with the particular participation television segment. In this example, if the particular participation television segment is broadcast during television programming (e.g., as programming related to the main television programming or as commercial programming occurring during a break in the main television programming) with viewers that typically are males between the ages of 25 and 40, then a first offer or gift likely to be of interest to males between the ages of 25 and 40 may be selected. If the particular participation television segment (e.g., the same participation television segment or a different participation television segment) is broadcast during television programming with viewers that typically are females between the ages of 40 and 65, then an offer or gift likely to be of interest to females between the ages of 40 and 65 may be selected.

The offers or gifts may be selected or targeted to participants in advance based on general demographic information known about viewers of the television programming being broadcast in association with the participation television segment. An administrator may assign a particular offer or gift to a participation television segment and all viewers or participants of the participation television segment may receive the same offer or gift selected by the administrator. The administrator may update or change the offer or gift based on updated demographic information for viewers associated with the television programming or responses to the offer or gift received from participants of the participation television segment. The offer or gift may be changed in real-time based on responses received during a participation television segment or may be changed for future participation television segments based on responses received. The administrator also may select multiple offers or gifts and select an order with which offers or gifts are selected. For instance, a viewer or participant may be presented with multiple offers or gifts in the order selected by the administrator in response to participating in a participation television segment.

The intermediary system 130 presents one or more communication methods with which the participant may communicate with the advertiser to redeem the offer or gift (270). For example, the intermediary system 130 accesses information related to one or more communications methods with which the advertiser associated with the selected offer or gift may be contacted and presents the one or more communication methods to the participant. In this example, the intermediary system 130 may present the one or more communication methods in a telephone call, a text or SMS message, an electronic mail message, an instant message, or another type of communication over network 105. The one or more communication methods may include a direct mail communication method, a transferred telephone call communication method, a scheduled telephone call communication method, and a credit card capture or direct purchase communication method.

The direct mail communication method may include the advertiser sending the participant an advertisement, gift, or offer using a direct communication from the advertiser to the participant. The direct communication may be in a form in which the participant may directly reply or may be in a form in which the participant may not directly reply. For instance, the communication may be an electronic mail communication, an instant message communication, a text or SMS communication, or a communication sent via physical mail (e.g., by a postal service or courier). In some examples, the offer may be presented to the participant in a manner in which the participant may send an acceptance message in which the participant may directly accept the offer without further communication by the participant. In other examples, the participant may have to visit a brick and mortar retail store to accept the offer or gift.

The transferred telephone call communication method may include the intermediary system 130 transferring a telephone call with the participant to the advertising system 140. The advertising system 140 may include a call center with which an operator may present the advertisement, offer, or gift to the participant using the transferred telephone call. Because the call was transferred from the intermediary system 130, the participant receives the advertisement, offer, or gift soon after participating in the participation television segment. The intermediary system 130 may detect whether the participant contacted the intermediary system 130 by a telephone call and only offer the transferred telephone call communication method if the participant contacted the intermediary system 130 by a telephone call.

The scheduled telephone call communication method includes the intermediary system 130 scheduling a telephone call between the participant and the advertising system 140. The intermediary system 130 may ask the participant when the participant would like to receive information associated with the advertisement, offer, or gift and schedule a call between the advertising system 140 and the participant. The call may be placed by the participant to the advertising system 140 or the advertising system 140 may place the call, at the time selected by the participant, to the participant using contact information provided by the participant. In some examples, allowing the participant to schedule a return call may enable the participant to continue to enjoy the television programming the participant was viewing and receive the advertisement, offer, or gift at a more convenient time.

The credit card capture or direct purchase communication method includes presenting an offer to the participant for direct acceptance or purchase. For example, the intermediary system 130 may present a specific offer to the participant and the participant may accept the offer with a simple reply to the offer. If the participant accepts the offer, the participant may provide the intermediary system 130 with credit card information to make the purchase or the intermediary system may access stored credit card or electronic purchasing information for the participant.

The intermediary system 130 receives a selection of at least one of the one or more communication methods with which the participant may communicate with the advertiser to redeem the offer or gift (280). For example, the participant selects a communication method and transmits the selection to the intermediary system 130. In this example, the participant may provide the selection to the intermediary system 130 in a telephone call, a text or SMS message, an electronic mail message, an instant message, or another form of network based communication. The participant may select a single communication method or multiple communication methods and the participant may agree to be contacted a single time, multiple times, or an indefinite number of times.

The intermediary system 130 facilitates an exchange of information related to the offer or gift, using the selected communication method, between the advertiser and the participant (290). If the participant selects the direct mail communication method, the intermediary system 130 accesses direct mail communication information for the participant and provides the direct mail communication information to the advertising system 140 to enable the advertiser to contact the participant by direct mail. The intermediary system may receive the direct mail communication information from the participant may receive the direct mail communication information for the participant from a third party provider, or may access the direct mail communication information for the participant from electronic storage. If the participant selects the transferred telephone call communication method, the intermediary system 130 transfers a telephone call with the participant to a call center included in the advertising system 140. If the participant selects the scheduled telephone call communication method, the intermediary system 130 schedules a telephone call at a time convenient for both the participant and the advertiser. In response to scheduling the call, the intermediary system accesses telephone contact information for the participant and provides the telephone contact information and the date and time of the call to the advertising system 140 to enable the advertiser to place a call to the participant at the scheduled time.

In some implementations, the participant only may be allowed to participate in the participation television segment if the participant agrees to be contacted by the advertiser associated with the advertising system 140. For instance, the participant may have to provide contact information with which the advertiser may contact the participant or listen to an advertisement, offer, or gift prior to being allowed to participate in the participation television segment. Participation in the participation television segment may be delayed until the participant selects a communication method with which the advertiser may exchange information with the participant. Participation in the participation television segment may otherwise be free of charges.

Figure 3:
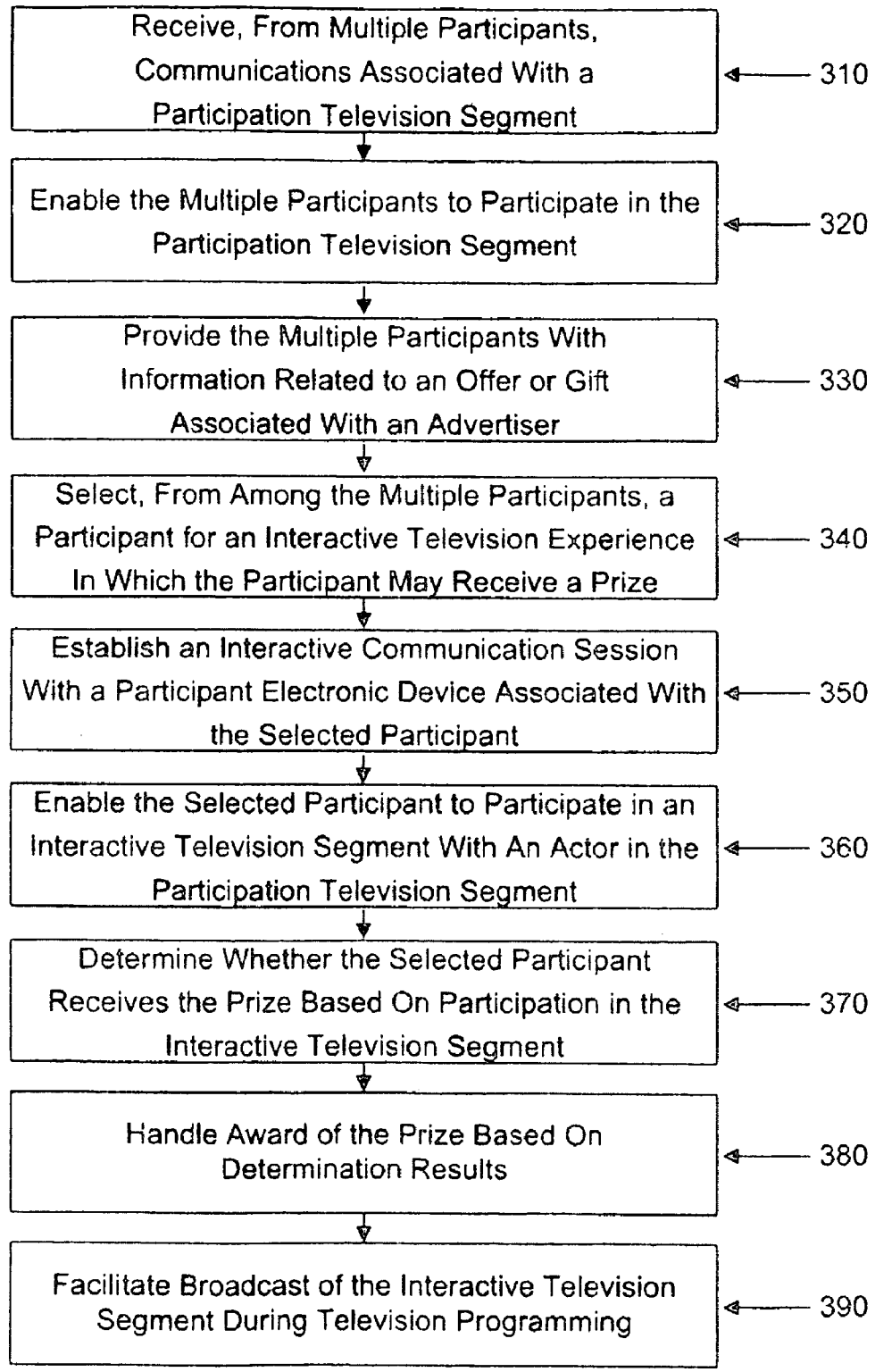
FIG. 3 is a flow chart of an example of a process for leveraging participation television to provide a participant with an interactive television experience in which the participant may receive a prize from an advertiser.

FIG. 3 illustrates an example of a process 300 for leveraging participation television to provide a participant with an interactive television experience in which the participant may receive a prize from an advertiser. For convenience, particular components described with respect to FIG. 1 are referenced as performing the process 300. However, similar methodologies may be applied in other implementations where different components are used to define the structure of the system, or where the functionality is distributed differently among the components shown by FIG. 1.

The intermediary system 130 receives, from multiple participants, communications associated with a participation television segment broadcast during television programming (310). For example, the intermediary system 130 receives communications from the multiple participant devices 120-124 over the network 105. The communications may be telephone calls, text or SMS messages, electronic mail messages, instant messages, or any other type of electronic message or network based communication. The communications may indicate a desire to participate in a participation television segment and may include information associated with such participation (e.g., an answer to a trivia question, etc.).

The intermediary system 130 enables the multiple participants to participate in the participation television segment based on the communications (320). For instance, the intermediary system 130 may request more information for the participants as part of participation in the participation television segment or may process the communications received from the multiple participants (e.g., in examples in which the communications include information associated with participation in the participation television segment) and enable participation based on the communications. The intermediary system 130 may enable the participant to provide an answer to a poll question, enter a contest, engage in a live participation segment, or otherwise participate in the participation television segment based on the communication session initiated by the participant.

The intermediary system 130 provides at least some of the multiple participants with information related to an offer or gift associated with an advertiser (330). For example, the intermediary system 130 may provide a participant with information related to an advertisement, offer, or gift using a communication method with which the participant contacted the intermediary system 130. In some examples, the intermediary system 130 may provide advertising lead generation or fulfillment of advertising leads as described above with respect to FIG. 2.

The intermediary system 130 selects, from among the multiple participants, a participant to participate in an interactive television experience in which the participant may receive a prize, that is different than the offer or gift, from the advertiser (340). In some examples, the intermediary system 130 selects a participant randomly from the participants in the participation television segment. In other examples, the intermediary system 130 selects a participant based on the participant's participation in the participation television segment. In these examples, the intermediary system 130 may select the participant who responded first to the participation television segment or may select the participant who responded most often to participation television segments associated with a particular television program or participation television segments associated with a particular participation television provider (e.g., a particular television network or a particular provider of participation television segments broadcast across multiple networks).

The intermediary system 130 also may select a participant based on quality of performance in the participation television segment. For instance, when the participation television segment involves a trivia question, the intermediary system 130 may randomly select a participant, but only from among participants that answered the trivia question correctly. The intermediary system 130 further may consider performance of the participant in multiple participation television segments. In some examples, a particular television program or a particular participation television provider may offer multiple participation television segments that include trivia questions and the participant that answers the most questions correctly for the multiple questions may be selected. The multiple participation television segments may be presented during a single program, over the course of a single day, over the course of a single week, over the course of a single month, or over the course of an entire television viewing season. Selecting a participant based on performance in multiple participation television segments may encourage viewers to more consistently watch television programming.

The intermediary system 130 establishes an interactive communication session with a participant electronic device associated with the selected participant (350). The interactive communication session may be configured to enable the selected participant to send and receive communications with at least one actor associated with the participation television segment. For example, the interactive communication session may be a telephone call, a video chat session, or any type of real-time electronic messaging session. The interactive communication session may be established using the communication method with which the participant used to contact the intermediary system 130 to participate in the participation television segment or may be established using another communication method. For example, the selected participant may send the intermediary system 130 a text or SMS message to participate in the participation television segment and then the intermediary system 130 may place a return telephone call to the selected participant to establish an interactive communication session. The intermediary system 130 also may send a return text or SMS message to the participant requesting the participant to place a telephone call to the intermediary system 130. The interactive communication session between the participant electronic device and the intermediary system 130 may be established soon after participation in the participation television segment or a later time.

The intermediary system enables the selected participant to participate in an interactive television segment between the selected participant and the at least one actor associated with the participation television segment (360). For example, the intermediary system 130 may enable an actor to exchange communications with the participant over the network 105 using the interactive communication session. In this example, the interactive television segment may be a game and the actor may propose questions associated with the game to the selected participant in a telephone call or real-time electronic messaging session. The questions may be trivia questions or other game show type questions. In some implementations, the main television programming may be game show programming and the interactive television segment may enable a remote viewer to participate in the game show. The game may be sponsored by an advertiser and may provide the advertiser a unique brand or product awareness experience.

The intermediary system 130 determines whether the selected participant receives the prize from the advertiser based on participation in the interactive television segment (370). The intermediary system 130 may determine whether selected participant receives the prize based on participation in a game associated with the interactive television segment. For example, the game may be a trivia question game, the prize may be a new car, and the intermediary system 130 may determine whether the participant wins the new car based on the participant's answers to the trivia questions presented in the game. In this example, if the participant answers a sufficient number (e.g., all) of the trivia questions correctly, then the intermediary system 130 determines that the participant receives the prize. The intermediary system 130 also may determine whether the participant receives the prize based on a sweepstakes, a lottery-type drawing, or other random event. For instance, the participant may participate in an interactive television segment in which the actor conducts a lottery-type drawing and the intermediary system 130 determines whether the selected participant receives the prize based on results of the lottery-type drawing. The drawing may occur during live television and may provide a unique advertising experience for the advertiser sponsoring the prize.

The intermediary system 130 handles award of the prize from the advertiser based on determination results (380). For example, the intermediary system 130 may award the prize to the participant if it determines that the participant met one or more criteria defined by the game associated with the participation television segment. If the intermediary system 130 determines that the participant did not meet one or more criteria defined by the game associated with the participation television segment, the system may determine not to award the prize to the participant. The intermediary system 130 may provide information to the participant indicating whether the participant won the prize and, if the participant won the prize, may provide information on how the participant may receive the prize.

The intermediary system 130 facilitates broadcast of the interactive television segment during television programming (390). For example, the intermediary system 130 may record the interactive television segment and provide the interactive television segment to the television provide 110 for broadcast. The television provider 110 may broadcast the interactive television segment soon after the segment occurs or may broadcast the interactive television segment at a later date (e.g., the next time the television program associated with the interactive television segment is broadcast). In some implementations, the intermediary system 130 may establish a real-time video feed with the television provider 110 or may facilitate establishment of the interactive communication session between the participant electronic device and the television provider 110 (e.g., transfer a telephone call with the participant to the television provider 110). In these implementations, the interactive television segment may be broadcast as a live interactive television segment. The live television segment may occur in real-time and be broadcast very close to the time that the interactive television segment occurs.

Although process 300 was described as being performed primarily by the intermediary system 130, other components may be configured to perform the process and human operators may assist in performing the process 300. For instance, in some implementations, human operators may assist in determining whether the selected participant receives the prize from the advertiser based on participation in the interactive television segment, and handling award of the prize from the advertiser based on determination results. In these implementations, the human operators may provide input to the intermediary system 130 or other electronic devices in performing the process 300.

Figure 4:
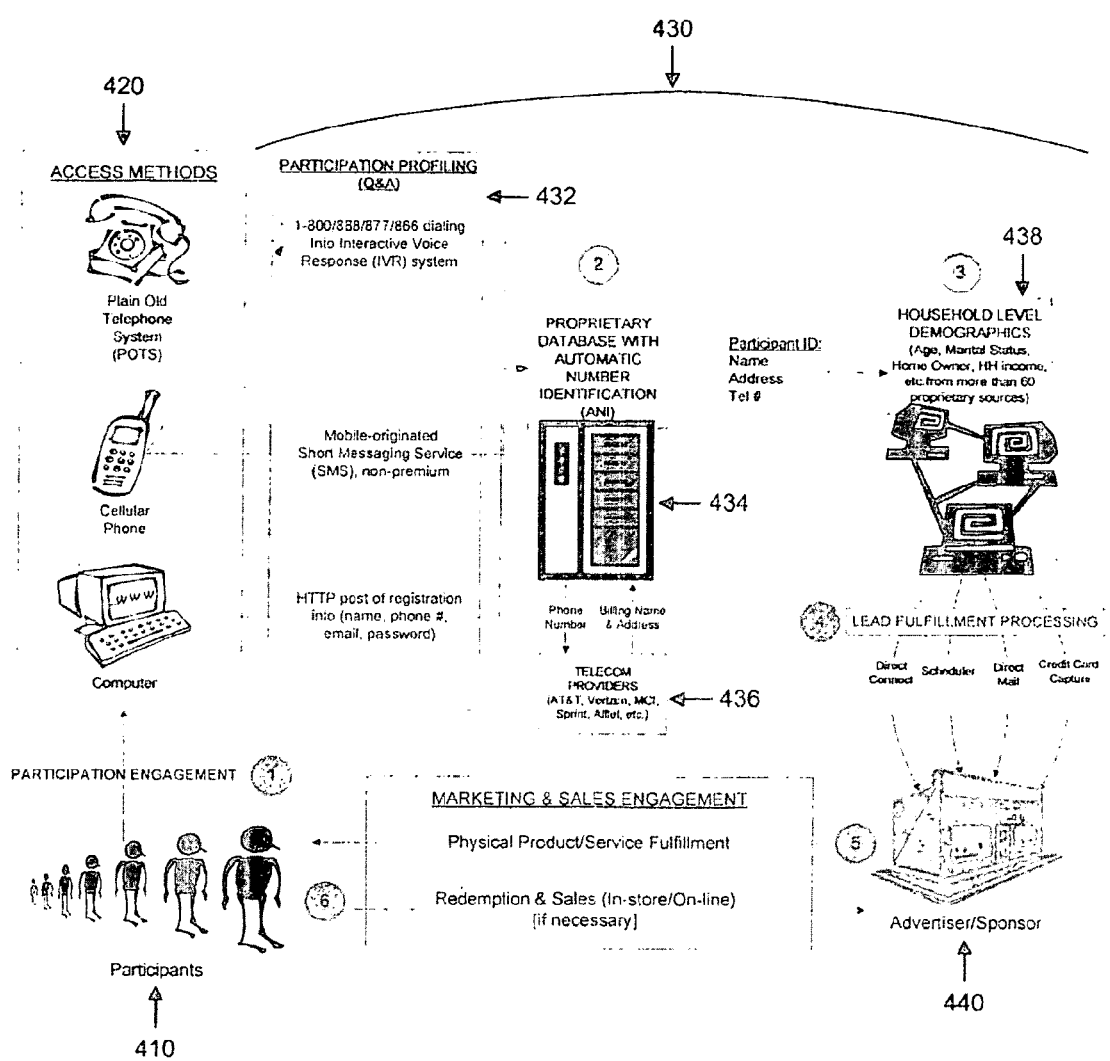
FIG. 4 is a diagram of an example system configured to leverage participation television to provide automatic advertising lead generation or fulfillment of advertising leads.

FIG. 4 depicts an example of a system 400 configured to leverage participation television to provide automatic advertising lead generation or fulfillment of advertising leads. The system 400 includes one or more participants 410, one or more participant devices 420, an intermediary system 430, and an advertiser or advertiser system 440.

The one or more participants 410 are people or users using the system 400. For instance, the one or more participants 410 may be viewers of television programming that wish to participate in a participation television segment broadcast during the television programming.

The one or more participant devices 420 are communication devices with which the one or more participants 410 may use to communicate with the intermediary system 430 to participate in a participation television segment. For example, the one or more participant devices 420 may include a landline telephone, a cellular telephone, a personal computer, or any other type of electronic device with which the one or more participants 410 may use to communicate with the intermediary system 430.

The intermediary system 430 includes a communication device 432, a participant identification device 434, a participant information data store 436, and a demographic information data store 438. The intermediary system 430 also includes a processing device or processor (not shown) configured to coordinate communications between and process information obtained from the communication device 432, the participant identification device 434, the participant information data store 436, and the demographic information data store 438. The processing device may be configured to execute instructions, stored on a computer-readable storage medium, to perform operations for leveraging participation television to provide automatic advertising lead generation or fulfillment of advertising leads.

The communication device 432 may be configured to receive communications from and establish communication sessions with the one or more participant devices 420. For example, the communication device 432 may be configured receive telephone calls placed by the one or more participants 410 using the one or more participant devices 420. The communication device 432 may receive telephone calls at a toll-free telephone number (such as a telephone number with an "800" area code) and may interact with the one or more participants using an interactive voice response (IVR) system. The communication device 432 also may connect a received call to an operator to enable the operator to interact with the participant that placed the call. The one or more participants 410 may participate and provide input to a participation television segment based on communications with the communication device 432.

The communication device 432 also may be configured to receive text or SMS messages. For instance, the communication device 432 may receive an SMS message sent from a mobile telephone and process the SMS message (e.g., extract an answer to a question or extract an entry to a contest) to enable the participant that sent the SMS message to participate in the participation television segment. The communication device 432 may be configured to send return text or SMS messages to the one or more participant devices 420. For example, the communication device 432 may send a return SMS message to a participant device to confirm receipt of an SMS message sent from the participant device or to request additional information from the participant 410 as part of the participation television segment. The return text or SMS messages may be automatically generated by the communication device 432 or may be entered by an operator and sent by the communication device 432.

The communication device 432 further may be configured to receive network-based or IP-based communications. For instance, the communication device 432 may be configured to receive a hypertext transfer protocol (HTTP) post request from a personal computer over the Internet. The HTTP post request may include information that the communication device 432 processes to enable the participant using the personal computer to participate in the participation television segment. The communication device 432 may be configured to send return network-based or IP-based communications and perform various web server operations.

The communication device 432 may include multiple communication devices, interface devices, and components. The communication device 432 may include different components for receiving communications over the different communication mediums with which participants may communicate with the communication device 432.

The participant identification device 434 may be configured to identify the one or more participants 410 that are communicating with the communication device 432 based on the one or more participant devices 420 the one or more participants 410 are using to communicate with the communication device 432. For example, the participant identification device 434 may include a database and may be configured to perform automatic number identification (ANI) operations to identify a telephone number of the one or more participant devices 420 the one or more participants 410 are using to communicate with the communication device 432. The participant identification device 434 may be configured to identify participants using other identification techniques. For instance, the participant identification device 434 may be configured to identify the one or more participants 410 based on an IP address associated with communications received from the one or more participant devices 420.

The participant information data store 436 may include electronic storage configured to store information relating the one or more participant devices 420 to the one or more participants 410. For example, the participant information data store 436 may store information associating telephone numbers with customers. In this example, the participant identification device 434 may provide a telephone number detected using ANI information to the participant information data store 436 and retrieve a billing name and address for the participant associated with the participant device being used to establish a telephone call with the communication device 432. In some implementations, the participant information data store 436 may be included in the participant identification device 434, rather than being a separate component. In other implementations, the participant information data store 436 may be operated by a third party and may not be included in the intermediary system 430. In these implementations, the participant information data store 436 may be operated by one or more telecommunication providers and the intermediary system 430 may communicate with the participant information data store 436 over a network.

The demographic information data store 438 may include electronic storage configured to store demographic information related to the one or more participants 410. The demographic information may include household level demographic information such as age, marital status, whether the participant is a home owner, the participant's household income level, etc. The demographic information may be used to select or target particular advertisements, offers, or gifts to the one or more participants 410 that participate in the participation television segment. Like the participant information data store 436, in some examples, the demographic information data store 438 may be operated by a third party and may not be included in the intermediary system 430. In these implementations, the demographic information data store 438 may receive information from many different sources and the intermediary system 430 may communicate with the demographic information data store 438 over a network.

The advertiser or advertiser system 440 may be configured to communicate with the intermediary system 430 to receive advertising leads. For example, the advertiser system 440 may communicate with the intermediary system 430 to receive information related to potential consumers to which the advertiser system 440 may offer an advertisement, offer, or gift. In this example, the intermediary system 430 may provide potential customer contact information (e.g., telephone number, electronic mail address, physical mailing address, etc.) to the advertising system 440 and the advertiser or advertiser system 440 may contact the potential customer using the contact information. The intermediary system 430 may enable or coordinate interaction between a participant and the advertiser or advertiser system 440 to establish an advertising lead or fulfill an order by the participant. The advertiser system 440 may be associated with a manufacturer, an online retailer, a brick and mortar retail store, or any other entity providing offers, gifts, or advertisements.

Figure 5:
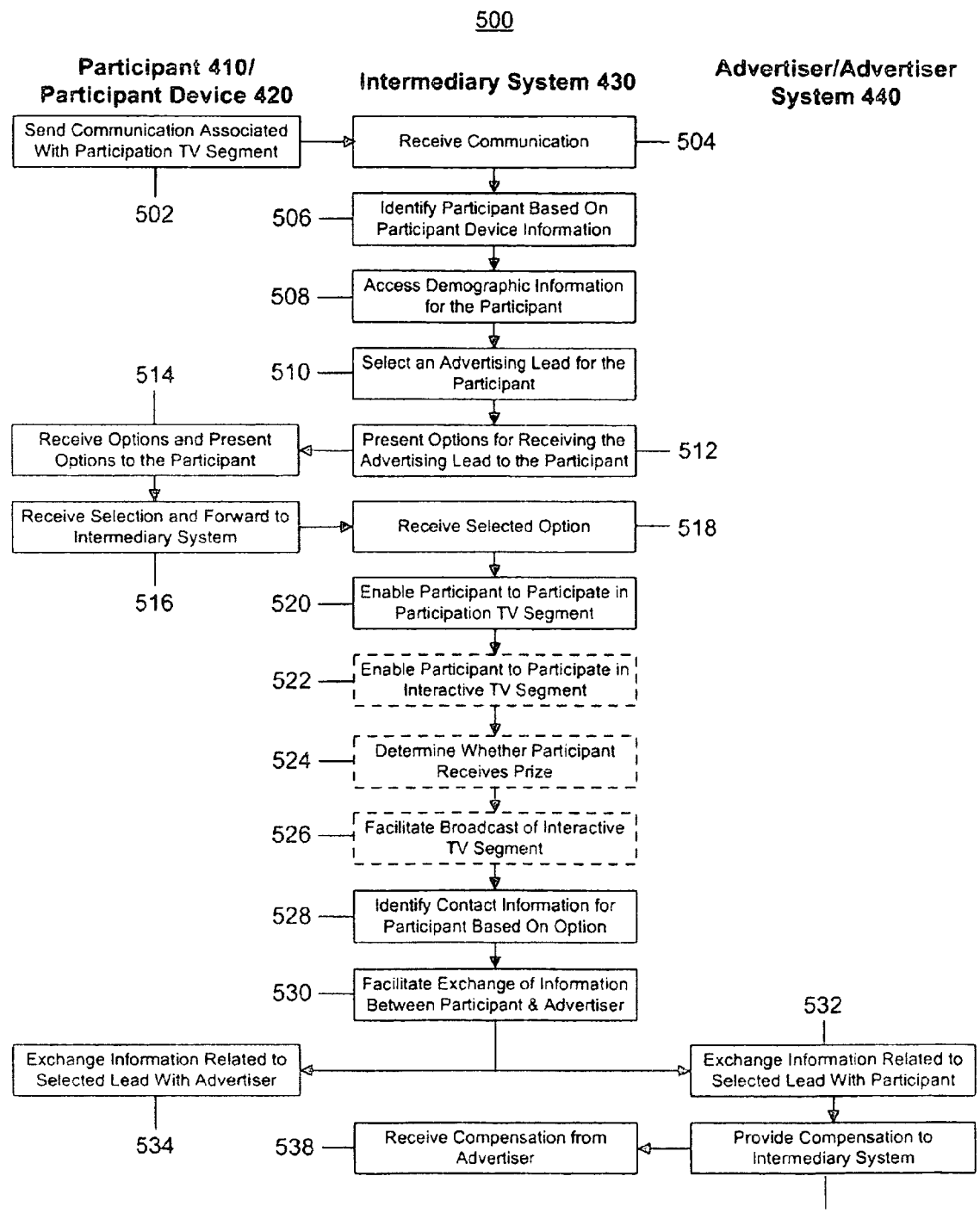
FIG. 5 is a flow chart of an example of a process for leveraging participation television to provide automatic advertising lead generation or fulfillment of advertising leads using the system described with respect to FIG. 4.

FIG. 5 illustrates an example of a process 500 for leveraging participation television to provide automatic advertising lead generation or fulfillment of advertising leads using the system described with respect to FIG. 4. For convenience, particular components described with respect to FIG. 4 are referenced as performing the process 500. However, similar methodologies may be applied in other implementations where different components are used to define the structure of the system, or where the functionality is distributed differently among the components shown by FIG. 4.

The participant device 420 sends a communication associated with a participation television segment to the intermediary system 430 (502) and the intermediary system 430 receives the communication (504). For instance, the participant device 420 may place a telephone call to the intermediary system 430, may send a text or SMS message to the intermediary system 430, or may send an electronic mail message to the intermediary system 430. The communication associated with the participation television segment may be sent to an address or number provided during the participation television segment and may include information (e.g., an answer to a question, a contest entry, etc.) associated with the participant's 410 participation in the participation television segment.

The intermediary system 430 identifies the participant 410 based on participant device information associated with the participant device 420 (506) and accesses demographic information for the identified participant (508). The intermediary system 430 may identify the participant device 420 based on a telephone number associated with a call received from the participant device 420 or an IP address associated with a network based communication received from the participation device 420. In implementations in which the participant device 420 is a telephone and the participant device places a telephone call to the intermediary system, the intermediary system may identify a telephone number for the participant device using ANI information. In these implementations, the intermediary system 430 may use the telephone number to access information (e.g., name and address) for a participant associated with the telephone number. Based on the accessed information for the participant, the intermediary system 430 may access demographic information for the participant.

The intermediary system 430 selects an advertising lead for the participant 410 (510) and presents options for receiving the advertising lead to the participant device 420 (512). For example, the intermediary system 430 may select an advertising lead for the participant 410 based on the accessed demographic information for the participant. In this example, the intermediary system 430 may compare attributes of multiple advertising leads to the demographic information for the participant and select an advertising lead that is most appropriate for the participant (e.g., the advertising lead that the participant is deemed most likely to be interested). The intermediary system 430 may present options for receiving the advertising lead to the participant device 420 using the communication method with which the participant device 420 used to contact the intermediary system 430. For instance, if the participant device 420 has established a telephone call with the intermediary system, the intermediary system 430 may present the options for receiving the advertising lead in the telephone call (e.g., using an IVR system). The options for receiving the advertising lead may include a direct mail option, a scheduled return call option, a credit card capture option, and a direct connect option. The options for receiving the advertising lead are described in more detail below with respect to FIGS. 6-9.

The participant device 420 receives the options for receiving the advertising lead and presents the options to the participant 410 (514). For instance, the participant device 420 may receive the options for receiving the advertising lead in one or more electronic communications over a network (e.g., in a telephone call, an electronic mail message, an instant message, or a text or SMS message). The participant device 420 presents the options to the participant 410 using an output device. For example, the participant device 420 may present the options to the participant 410 using a display device, a speaker, or another type of output device.

The participant device 420 receives a selection of an option for receiving the advertising lead and forwards the selection to the intermediary system 430 (516). The participant device 420 may receive a selection of an option for receiving the advertising lead based on user input entered by the participant 410 to the participant device 420. In some implementations, the participant device 420 may be configured to automatically select an option for receiving advertising leads and select the option without input from the participant 410. After receiving the selection of the option, the participant device 420 forwards selection information to the intermediary system 430 to indicate which option the participant 410 selected. The participant device 420 may forward selection information to the intermediary system 430 in an electronic communication over a network. The selection information may include a selection of a single option or a selection of multiple options.

The intermediary system 430 receives the selected option (518) and enables the participant 410 to participate in the participation television segment (520). For instance, the intermediary system 430 may receive selection information from the participant device 420 in an electronic communication over a network and may process the selection information to determine the option selected by the participant 410. Based on receiving the selected option, the intermediary system 430 enables the participant 410 to participate in the participation television segment. Enabling the participant 410 to participate in the participation television segment may include exchanging further communications with the participant device 420 or processing previous communications received from the participant device 420 that include information (e.g., answers to poll or trivia questions) related to participation in the participation television segment. Participation in the participation television segment may be conditioned on the participant 410 selecting an option and agreeing to be contacted by the advertiser.

The intermediary system 430 optionally may enable the participant to participate in an interactive television segment (522), determine whether the participant receives a prize based on the participation (524), and facilitate broadcast of the interactive television segment (526). For example, the intermediary system 430 may determine that the participant 410 has an established interactive communication session (e.g., telephone call, instant messaging connection, video chat connection, etc.) or may establish an interactive communication session with the participant 410. Establishing the interactive communication session with the participant 410, may include placing a telephone call to the participant 410 or requesting (e.g., with a text or SMS message) that the participant 410 place a telephone call to a telephone number associated with the intermediary system 430.

Using the interactive communication session, the intermediary system 430 enables the participant to participate in the interactive television segment. For example, a participant 410 may place a telephone call to the intermediary system 430 and the intermediary system 430 may ask the participant a question related to television programming. The question also may be related to a participation television segment to which the participant 410 previously responded. The question may ask the participant 410 for thoughts or comments on an issue related to the television programming. For instance, for a court television program, the question may ask the participant 410 whether the participant 410 agrees or disagrees with the outcome of a court case. The intermediary system 430 may record the participant's 410 answer to the question and broadcast the participant's 410 answer during a live studio broadcast or in a later episode of the court television program. The participant 410 also may be entered into a sweepstakes for participating in the interactive television segment. The entry into the sweepstakes may be a prize in addition to the offer or gift presented to the participant 410 for participating in the participation television segment.

The intermediary system 430 identifies contact information for the participant 410 based on the option selected by the participant 410 using the participant electronic device 420 (528). The intermediary system 430 may identify direct mail contact information or telephone number contact information for the participant 410. In some implementations, the intermediary system 430 many identify credit card or other electronic payment information for the participant 410 for fulfillment of an order placed by the participant 410. The intermediary system 430 may identify the contact information by accessing the contact information from electronic storage, receiving the contact information from the participant 410 in communications with the participant electronic device 420, or may identify the contact information by detecting contact information associated with the participant device 420 with which the participant 410 used to contact the intermediary system 430.

Based on the contact information, the intermediary system 430 facilitates exchange of information between the participant 410 and the advertiser system 440 (530). For instance, the intermediary system 430 may provide contact information for the participant 410 to the advertiser system 440. In some examples, the intermediary system 430 may transfer an established communication session with the participant device 420 used by the participant 410 to the advertiser system 440 or the intermediary system 430 may route communications between the participant device 420 and the advertiser system 440. The intermediary system 430 also may provide electronic payment information for the participant 410 to the advertiser system 440 to enable the advertiser system 440 to complete a transaction with the participant 410.

In facilitating the exchange of information between the participant 410 and the advertiser system 440, the advertiser system 440 and the participant 410 may exchange information related to a selected lead (532 and 534). For example, the advertiser system 440 may use contact information for the participant 410 received from the intermediary system 430 to contact the participant 410. In this example, the advertiser system 440 may receive a telephone number for the participant 410 and place a call to the participant 410 to provide information related to the advertisement, offer, or gift. The advertiser system 440 also may receive a home address for the participant 410 and mail information related to the advertisement, offer, or gift to the home address of the participant 410.

In some implementations, the participant 410 may initiate contact with the advertiser system 440 based on information provided by the intermediary system 430. In these implementations, the intermediary system 430 may provide the participant 410 with contact information for the advertiser system 440 and inform the advertiser system 440 that the participant 410 plans to contact the advertiser system 440. The intermediary system 430 may arrange a time and date at which the participant 410 plans to contact the advertiser system 440.

In implementations in which the intermediary system 430 provides electronic payment information for the participant 410 to the advertiser system 440, the advertiser system 440 processes an order using the electronic payment information and sends a receipt of the transaction to the participant 410. The advertiser system 440 also may send goods purchased to the participant 410 or instructions for receiving the goods purchased to the participant 410. For instance, the advertiser system 440 may send the participant a certificate, coupon, or other identifying information with which the participant 410 may use to pick up the goods purchased at a retail location associated with the advertiser system 440.

In response to receiving the advertising lead or order from the intermediary system 430, the advertiser system 440 provides compensation to the intermediary system 430 (536) and the intermediary system 430 receives the compensation from the advertiser (538). For example, the advertiser system 440 may compensate the intermediary system 430 for each advertising lead or order the intermediary system 430 arranges for the advertiser system 440. In this example, the advertiser system 440 may pay the intermediary system 430 for each participant 410 the intermediary system 430 identifies for the advertiser system 440. The advertiser system 440 may pay the intermediary system 430 using an electronic payment techniques each time an advertising lead or order is arranged or may track a number of advertising leads or orders arranged by the intermediary system 430 and pay the intermediary system 430 on at periodic (e.g., monthly) basis. The advertiser system 440 also may pay a periodic (e.g., monthly) fee to the intermediary system 430 that does not vary based on the number advertising leads or orders arranged by the intermediary system 430. In some examples, compensation from the advertiser system 440 to the intermediary system 430 may be based on actual purchases or sales by participants that result from advertising leads or orders provided by the intermediary system 430.

Figure 6:
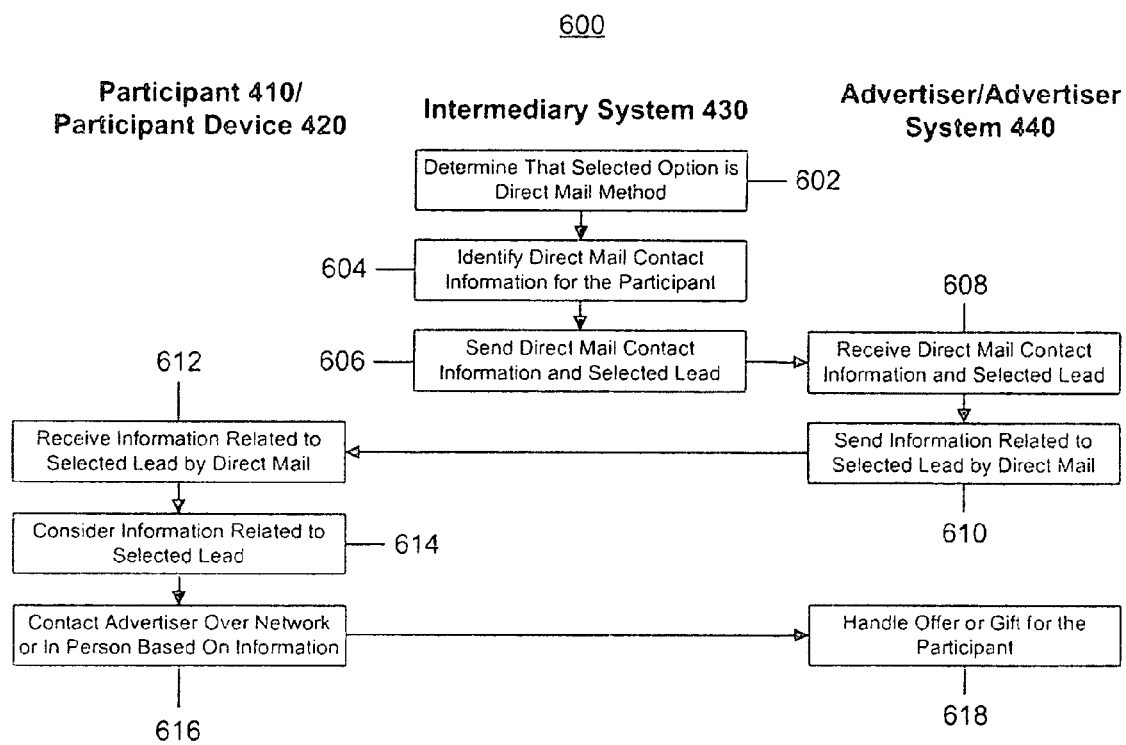
FIGS. 6-9 are flow charts of examples of processes for facilitating exchange of information between a participant and an advertiser.

FIG. 6 illustrates an example of a process 600 for facilitating exchange of information between a participant and an advertiser. The process 600 may be used in performing the processes described with respect to numerals 528 through 534 in FIG. 5. For convenience, particular components described with respect to FIG. 4 are referenced as performing the process 600. However, similar methodologies may be applied in other implementations where different components are used to define the structure of the system, or where the functionality is distributed differently among the components shown by FIG. 4.

The intermediary system 430 determines that the option selected by the participant 410 using the participant electronic device 420 is a direct mail option (602). For instance, the intermediary system 430 may process selection information received from the participant device 420 to determine that the option selected by the participant 410 is a direct mail option.

Based on determining that the participant 410 selected the direct mail option, the intermediary system 430 identifies direct mail contact information for the participant 410 (604). For example, the intermediary system 430 may access direct mail contact information for the participant 410 from electronic storage (e.g., stored profile or account data for the participant 410) or may process communications received from the participant device 420 to obtain direct mail contact information for the participant 410. In the later example, the participant device 420 may include direct mail contact information (e.g., contact information stored by the participant device 420 and automatically provided in communications with the intermediary system 430 or contact information entered by the participant 410) in the selection information transmitted to the intermediary system 430. In some implementations, the intermediary system 430 may exchange subsequent communications with the participant device 420 to request and obtain direct mail contact information for the participant 410. The direct mail contact information may include a physical mailing address, an electronic mail address, or other types of direct mail contact information.

The intermediary system 430 sends the direct mail contact information and the selected advertising lead to the advertiser system 440 (606). The intermediary system 430 may send the direct mail contact information and the selected advertising lead to the advertiser system 440 in an electronic communication over a network. The intermediary system 430 may send a specific advertising lead (e.g., one selected by the participant 410 or one selected by the intermediary system 430 based on demographic information) to the advertiser system 430 or may send a more general description of an advertising lead to the advertiser system 440. The more general description may include information regarding a type of advertisement, offer, or gift in which the participant 410 is interested or may merely be an indication that the participant 410 has been identified as a potential consumer of products or services related to advertisements, offers, or gifts offered by the advertiser system 440.

The advertiser system 440 receives the direct mail contact information and the selected advertising lead (608) and sends information related to the selected advertising lead to the participant 410 by direct mail (610). For example, the advertiser system 440 may receive the direct mail contact information and the selected advertising lead in an electronic communication over a network. In response to receiving the direct mail contact information, the advertiser system 440 selects advertising materials (e.g., an advertisement, offer, or gift) associated with the advertising lead and sends the advertising material to the participant 410 by direct mail. In some implementations, the advertiser system 440 may automatically access electronic advertising material stored at the advertiser system 440 and send the electronic advertising material to the participant 410 in an electronic mail message. In these implementations, the advertiser system 440 may be configured to process the advertising leads generated by the intermediary system 430 without human intervention. In other implementations, the advertiser system 440 provides the direct mail contact information for the participant 410 to employees associated with the advertiser. In these implementations, the employees may obtain printed advertising materials associated with the advertising lead and send the printed advertising materials to the participant using physical mail via a postal service or courier.

The participant 410 receives information related to the selected advertising lead by direct mail (612). For instance, the participant 410 may receive electronic advertising material from the advertiser system 440 in an electronic mail message or the participant 410 may receive printed advertising materials sent by the advertiser system 440 using physical mail.

The participant 410 considers the information related to the selected advertising lead (614) and contacts the advertiser based on the information (616). For example, if the participant 410 wishes to purchase a good or service presented in an advertisement, accept an offer made by the advertiser, or accept a gift offered in the advertising materials, the participant 410 contacts the advertiser. The participant 410 may contact the advertiser by going, in person, to a brick and mortar retail store associated with the advertiser. At the retail store, the participant 410 may receive a free gift offered by the advertiser or may arrange to purchase a good or service presented in the advertising materials. The participant 410 also may contact the advertiser using electronic communication mechanisms. For instance, the participant 410 may place a telephone call to the advertiser to receive a free gift or arrange to purchase a good or service. The participant 410 also may visit an online retail location associated with the advertiser or send an electronic mail message to the advertiser. In implementations in which the advertising materials are sent to the participant 410 by an electronic mail message, the participant may contact the advertiser by responding to the electronic mail message or selecting a link included in the electronic mail message that directs the participant 410 to an online retail location associated with the advertiser or prompts an electronic communication to an appropriate electronic communication address for the retailer.

The advertiser system 440 handles the offer or gift for the participant (618). In implementations in which the participant 410 electronically contacts the advertiser, the advertiser system 440 may automatically handle the offer or gift without human intervention or may provide information to an employee of the advertiser with which the employee may handle the offer or gift. In implementations in which the participant 410 contacts the advertiser by visiting a retail store associated with the advertiser, employees at the retail store may handle the offer or gift for the participant 410.

Figure 7:
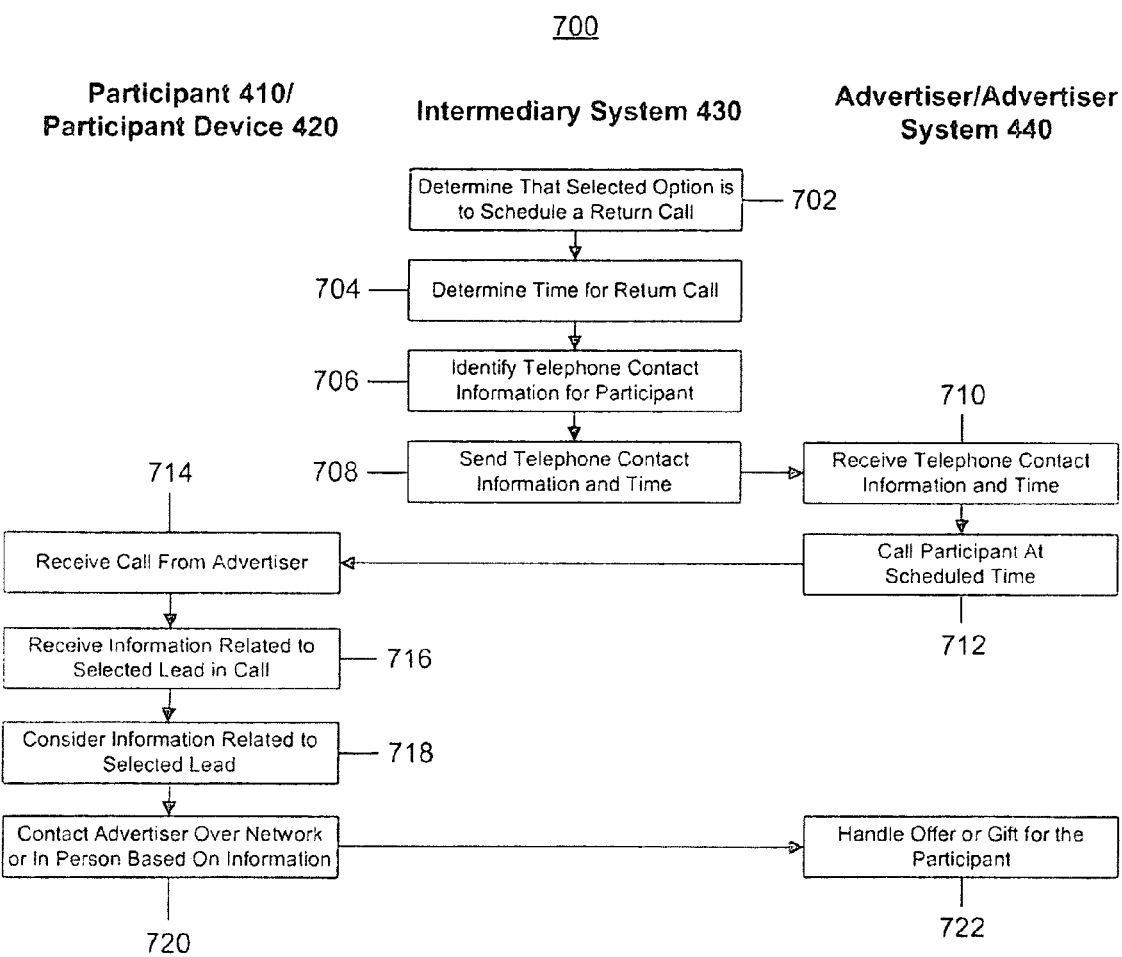

FIG. 7 shows another example of a process 700 for facilitating exchange of information between a participant and an advertiser. The process 700 may be used in performing the processes described with respect to numerals 528 through 534 in FIG. 5. For convenience, particular components described with respect to FIG. 4 are referenced as performing the process 700. However, similar methodologies may be applied in other implementations where different components are used to define the structure of the system, or where the functionality is distributed differently among the components shown by FIG. 4.

The intermediary system 430 determines that the option selected by the participant 410 using the participant electronic device 420 is to schedule a return call (702). For instance, the intermediary system 430 may process selection information received from the participant device 420 to determine that the option selected by the participant 410 is to schedule a return call.

Based on determining that the participant 410 selected the scheduled return call option, the intermediary system 430 determines a time for the return call (704). The time for the return call may be a time and date requested by the participant 410. For example, in selecting the scheduled return call option, the participant 410 also may provide information requesting a specific date and time for the return call that is convenient for the participant 410. The intermediary system 430 also may exchange subsequent communications with the participant device 420 to request and obtain a preferred date and time for the return call. In some implementations, the time for the return call may be a time of day that is typically convenient for the participant 410, but not necessarily set forth a specific day. The time also may be a range (e.g., between 4:00 P.M. and 6:00 P.M.) that is convenient for the participant 410, rather specifying a specific time.

In some examples, the advertiser system 440 selects the time for the return call and the intermediary system 430 informs the participant of the time. The intermediary system 430 also may account for calendar or work schedules for the participant 410 and the advertiser in determining a time for the return call. For instance, the intermediary system 430 may know a work schedule for employees of the advertiser and allow the participant 410 to select a time based on the work schedule. The intermediary system 430 further may track scheduled calls between participants and the advertiser and schedule a return call at a time when the call would be convenient for the advertiser. The intermediary system 430 may access calendar information for the participant 410 and determine a time for the call based on the participant's calendar. Using the above techniques, the intermediary system may determine a time for the return call that is convenient for both the participant 410 and the advertiser.

The intermediary system 430 also identifies telephone contact information for the participant 410 (706). For example, the intermediary system 430 may access telephone contact information for the participant 410 from electronic storage (e.g., stored profile or account data for the participant 410) or may process communications received from the participant device 420 to obtain telephone contact information for the participant 410. In the later example, the participant device 420 may include telephone contact information (e.g., contact information stored by the participant device 420 and automatically provided in communications with the intermediary system 430 or contact information entered by the participant 410) in the selection information transmitted to the intermediary system 430. In some implementations, the intermediary system 430 may exchange subsequent communications with the participant device 420 to request and obtain telephone contact information for the participant 410.

The intermediary system 430 sends telephone contact information for the participant 410 and the determined time for the return call to the advertiser system 440 (708). The intermediary system 430 may send the telephone contact information and the determined time to the advertiser system 440 in an electronic communication over a network.

The advertiser system 440 receives the telephone contact information for the participant 410 and the determined time for the return call (710) and calls the participant 410 at the scheduled time (712). The advertiser system 440 may receive the telephone contact information and the determined time in an electronic communication over a network. In some implementations, the advertiser system 440 may automatically call the participant 410 at the determined time using the telephone contact information. In these implementations, the advertiser system 440 may be configured to present an automated advertisement, offer, or gift to the participant 410. The advertiser system 440 may include an IVR system to place a scheduled return call to the participant 410. The participant 410 may interact with the IVR call to accept an offer or gift or request to speak to a live call center operator. In other implementations, the advertiser system 440 provides the telephone contact information for the participant 410 to a call center operator of the advertiser and the call center operator places the return call to the participant 410 at the scheduled time.

The recipient 410 receives the return call from the advertiser (714) and receives information related to a selected advertising lead (e.g., advertisement, offer, or gift) in the return call (716). For instance, the participant 410 may answer a telephone call placed by the advertiser and receive information related to the advertising lead in a call script (e.g., an automated call script or a script presented by a call center operator) included in the telephone call.

The participant 410 considers the information related to the selected advertising lead (718), contacts the advertiser based on the information (720), and the advertiser system 440 handles the offer or gift for the participant (722). In some implementations, the participant 410 contacts the advertiser by accepting an offer or gift or placing an order during the return call initiated by the advertiser. The participant 410 may consider the information related to the selected advertising lead (718), may contact the advertiser based on the information (720), and the advertiser system 440 may handle the offer or gift for the participant (722) using techniques similar to those described above with respect to numerals 614, 616, and 618 shown in FIG. 6.

Figure 8:
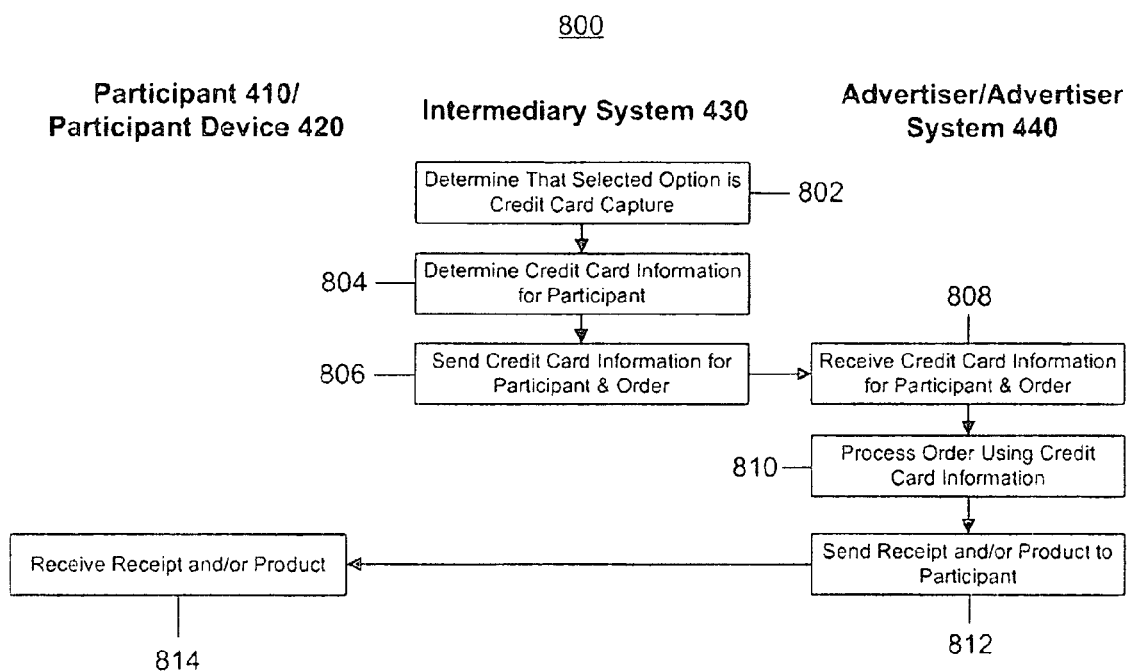

FIG. 8 depicts another example of a process 800 for facilitating exchange of information between a participant and an advertiser. The process 800 may be used in performing the processes described with respect to numerals 528 through 534 in FIG. 5. For convenience, particular components described with respect to FIG. 4 are referenced as performing the process 800. However, similar methodologies may be applied in other implementations where different components are used to define the structure of the system, or where the functionality is distributed differently among the components shown by FIG. 4.

The intermediary system 430 determines that the option selected by the participant 410 using the participant electronic device 420 is to complete an electronic order using credit card information (802). For instance, the intermediary system 430 may process selection information received from the participant device 420 to determine that the option selected by the participant 410 is a credit card capture option. In selecting the credit card capture option, the participant 410 may accept an offer presented by the intermediary system 430 to place an order for a specific good or service.

Based on determining that the participant 410 selected the credit card capture option, the intermediary system 430 determines credit card (or other electronic payment) information for the participant 410 (704). The credit card information may be a credit card number, an expiration date, and an authorization code. The intermediary system 430 may access credit card information for the participant 410 from electronic storage (e.g., stored profile or account data for the participant 410) or may process communications received from the participant device 420 to obtain credit card information for the participant 410. In the later example, the participant device 420 may include credit card information (e.g., credit card information stored by the participant device 420 and automatically provided in communications with the intermediary system 430 or credit card information entered by the participant 410) in the selection information transmitted to the intermediary system 430. In some implementations, the intermediary system 430 may exchange subsequent communications with the participant device 420 to request and obtain credit card information for the participant 410.

The intermediary system 430 sends the credit card information and the order to the advertiser system 440 (806). The intermediary system 430 may send the credit card information and the order to the advertiser system 440 in an electronic communication over a network. The order may be a specific order of a good or service for a specific price that is selected or otherwise agreed to by the participant 410.

The advertiser system 440 receives the credit card information and the order (808) and processes the order using the credit card information (810). For example, the advertiser system 440 may receive the credit card information and the order in an electronic communication over a network. In response to receiving the credit card information and the order, the advertiser system 440 authorizes the participant's credit card for the purchase price of the good or service and arranges to provide the good or service to the participant 410. In some implementations, the advertiser system 440 may automatically process the order without human intervention. In other implementations, the advertiser system 440 provides the credit card information for the participant 410 to employees associated with the advertiser to enable the employees to process the order.

After processing the order, the advertiser system 440 sends a receipt and the good to the participant 410 (812). The receipt may be a record of the electronic transaction that occurred in processing the order. The receipt may include the amount charged, the good or service purchased, and the credit card used. The advertiser system 440 also may send the good purchased to the participant 410. When the good is a physical good, the advertiser system 440 may arrange for shipment of the good to the participant 410 using a postal service or courier or may provide information (e.g., a token, coupon, certificate, etc.) to the participant 410 to enable the participant 410 to pick up the good at a retail store location associated with the advertiser. When the good is an intangible good or service, the advertiser system 440 may provide information (e.g., a token, coupon, certificate, etc.) to the participant 410 to enable the participant 410 to receive the good or service.

The participant 410 receives the receipt and product (814). For instance, the participant 410 may receive an electronic receipt from the advertiser system 440 in an electronic communication and may receive a physical good sent by the advertiser system 440 using physical mail.

Figure 9:
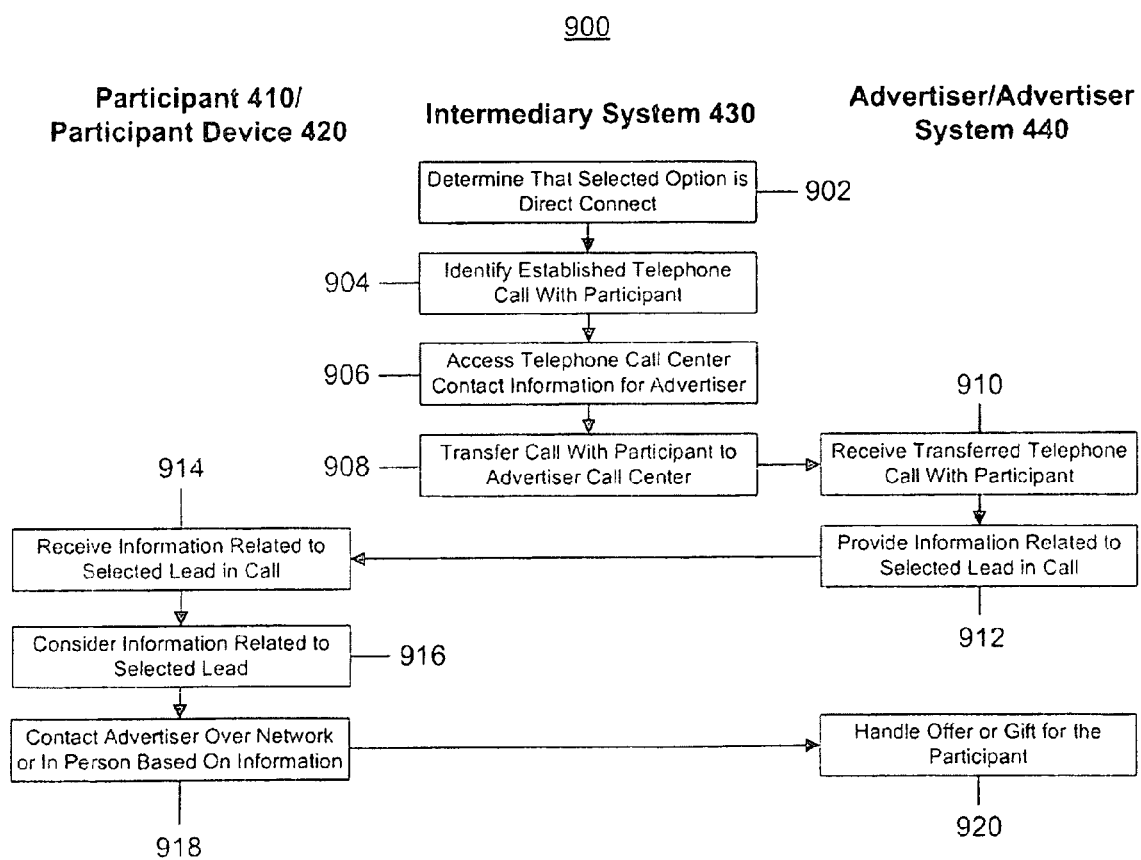

FIG. 9 illustrates yet another example of a process 900 for facilitating exchange of information between a participant and an advertiser. The process 900 may be used in performing the processes described with respect to numerals 528 through 534 in FIG. 5. For convenience, particular components described with respect to FIG. 4 are referenced as performing the process 900. However, similar methodologies may be applied in other implementations where different components are used to define the structure of the system, or where the functionality is distributed differently among the components shown by FIG. 4.

The intermediary system 430 determines that the option selected by the participant 410 using the participant electronic device 420 is a direct connect option (902). For instance, the intermediary system 430 may process selection information received from the participant device 420 to determine that the option selected by the participant 410 is a direct connect option.

Based on determining that the participant 410 selected the direct connect option, the intermediary system 430 identifies an established telephone call with the participant 410 (904). For example, the intermediary system 430 may identify an established call with a participant device 420 that has a telephone number corresponding to a known telephone number for the participant 410. When the participant 410 sends selection information to the intermediary system 430 in a telephone call, the intermediary system 430 may identify the telephone call from which the selection information was received as the established telephone call with the participant 410.

The intermediary system 430 accesses telephone call center contact information for the advertiser system 440 (906). For instance, the intermediary system 430 accesses, from electronic storage, a telephone number for a call center operated by the advertiser. The intermediary system 430 also may receive a telephone number for a call center operated by the advertiser in an electronic communication from the advertiser system 440. The intermediary system 430 may determine which advertiser to contact based on the advertising lead selected for the participant 410.

The intermediary system 430 transfers the call with the participant 410 to the advertiser system 440 (908). For example, the intermediary system 430 connects the identified telephone call with the participant 410 to a telephone number accessed for the advertiser call center.

The advertiser system 440 receives the transferred telephone call with the participant 410 (910). In some implementations, the advertiser system 440 may automatically answer the transferred telephone call. In these implementations, the advertiser system 440 may connect the call with an automated IVR system to present an automated message to the participant 410 or may place the call on hold until a live operator is available to handle the call. In other implementations, a live operator at the advertiser call center answers the call to establish a connection with the transferred telephone call.

The advertiser provides information related to the selected lead in the transferred telephone call (912) and the participant 410 receives information related to a selected advertising lead (e.g., advertisement, offer, or gift) in the return call (914). For instance, the advertiser may provide information related to the advertising lead in a call script (e.g., an automated call script or a script presented by a call center operator) included in the transferred telephone call and the participant 410 may receive the information.

The participant 410 considers the information related to the selected advertising lead (916), contacts the advertiser based on the information (918), and the advertiser system 440 handles the offer or gift for the participant (920). In some implementations, the participant 410 contacts the advertiser by accepting an offer or gift or placing an order during the transferred call. The participant 410 may consider the information related to the selected advertising lead (916), may contact the advertiser based on the information (918), and the advertiser system 440 may handle the offer or gift for the participant (920) using techniques similar to those described above with respect to numerals 614, 616, and 618 shown in FIG. 6.

Figure 10:
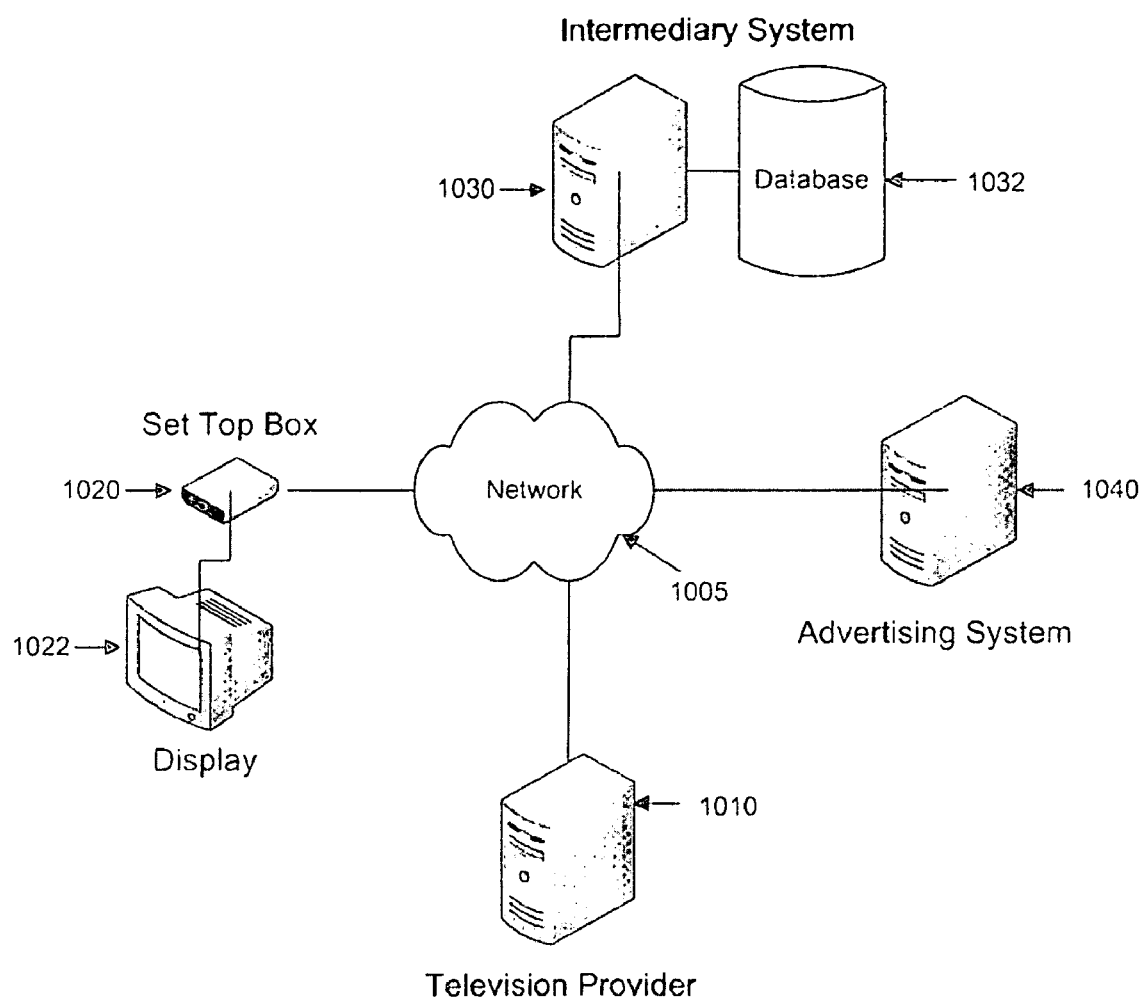
FIG. 10 is a block diagram of an example system configured to leverage participation television to provide automatic advertising lead generation or fulfillment of advertising leads.

FIG. 10 depicts an example of a system 1000 configured to leverage participation television to provide automatic advertising lead generation or fulfillment of advertising leads. The system 1000 includes a network 1005, a television provider 1110, a set top box 1120, an intermediary system 1030, and an advertising system 1040. The network 1005 facilitates communications between the television provider 1010, the set top box 1120, the intermediary system 1030, and the advertising system 1040. The network 1005, the television provider 1010, the intermediary system 1030, and the advertising system 1040 may be similar to the network 105, the television provider 110, the intermediary system 130, and the advertising system 140 described above with respect to FIG. 1.

The set top box 1020 is a type of participant device with which a participant may use to view television programming and participate in participation television segments. The set top box 1020 may be an electronic device that connects to a television or other display (e.g., the display 1022) and receives a signal from an external signal source (e.g., the television provider 1010). The set top box 1020 may be configured to convert a signal received from the external signal source into content displayed on a television screen or display. The set top box 1020 may receive many types of signals from the network 1005. For example, the set top box 1020 may receive ethernet cable signals, signals from a satellite dish, signals from a coaxial cable, signals from a telephone line (e.g., digital subscriber line (DSL) connections), and signals from VHF or UHF antenna. Content received by the set top box may include any type of video content, audio content, network content (e.g., web pages), interactive games, or other electronic content.

The set top box 1020 also may be configured to send electronic communications to the television provider 1010 or other devices connected to the network 1005. Based on the ability of the set top box 1020 to receive and send communications over the network 1005, the set top box 1020 may be configured to enable a viewer to participate in a participation television segment by interacting with the set top box 1020. For instance, the set top box 1020 may be configured to receive signals from a remote control operated by a participant. The participant may use the remote control to provide user input (e.g., answers to questions, commands for an interactive game, etc.) to the set top box 1020 related to a participation television segment. In addition, the set top box 1020 may include processing devices and electronic storage for executing programs related to participation television segments. The set top box 1020 further may include other communication devices that enable a user to participate in a participation television segment. For example, the set top box 1020 may include a microphone that captures words spoken by a viewer. In this example, the set top box 1020 may transmit the microphone output over the network 1005 to establish an interactive communication session in which the viewer may orally communicate with an actor involved in a participation television segment.

The display 1022 may be any type of electronic display configured render a visual display of content. For instance, the display may be a television, a monitor, or a projector.

Figure 11:
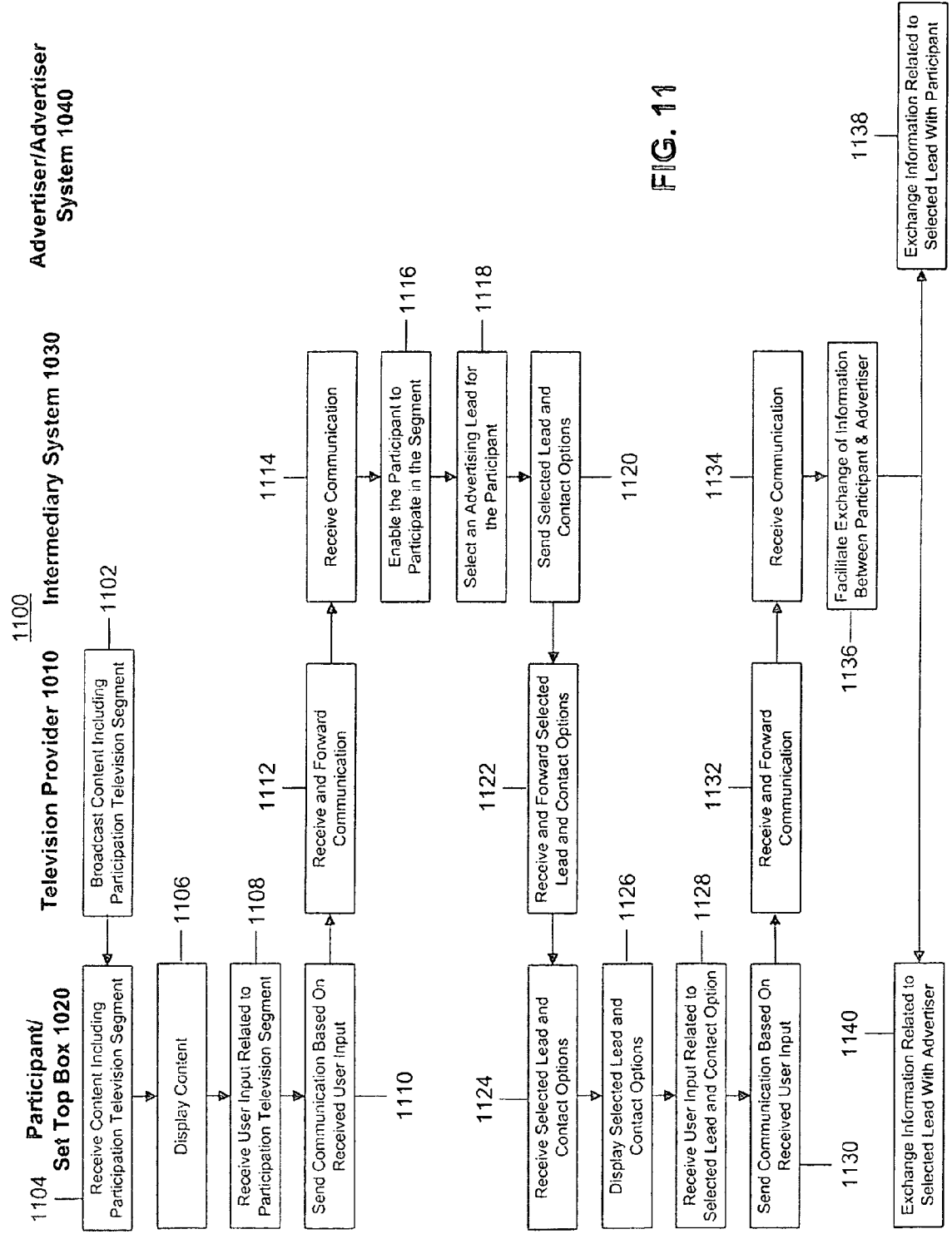
FIG. 11 is a flow chart of an example of a process for leveraging participation television to provide automatic advertising lead generation or fulfillment of advertising leads using the system described with respect to FIG. 10.

FIG. 11 illustrates an example of a process 1100 for leveraging participation television to provide automatic advertising lead generation or fulfillment of advertising leads using the system described with respect to FIG. 10. For convenience, particular components described with respect to FIG. 10 are referenced as performing the process 1100. However, similar methodologies may be applied in other implementations where different components are used to define the structure of the system, or where the functionality is distributed differently among the components shown by FIG. 10.

The television provider 1010 broadcasts content including a participation television segment (1102). The television provider 1010 may broadcast content to multiple devices over the network 1005. The television provider 1010 may broadcast the content as cable television programming, satellite television programming, Internet television programming, or any other type of television broadcast mechanism.

The set top box 1020 receives the content including the participation television segment (1104) and displays the content on the display 1022 (1106). For example, the set top box 1020 may receive a television signal including the content from the network 1005 and may convert the signal into a format used by the display 1022. The set top box 1020 may provide the converted signal to the display 1022 to cause the display 1022 to render a display of the content including the participant television segment. The participation television segment may be a poll question, a trivia question, an interactive game, or any other type of participation television segment.

The set top box 1020 receives user input related to the participation television segment from the participant (1108) and sends a communication to the television provider 1010 based on the user input (1110). The set top box 1020 may receive user input from the participant based on the participant's interaction with a remote control or the participant's interaction with other input controls recognized by the set top box. The user input may be an answer to a poll question or trivia question that the participant selected using a remote control. The set top box 1020 sends an electronic communication, over the network 1005, to the television provider 1010 based on the user input received from the participant. The electronic communication may include information related to the participant and the participant's participation in the participation television segment. For instance, the electronic communication may include a subscriber identifier that identifies the participant and may include information indicating an answer to a poll or trivia question included in the participation television segment. In some implementations, the set top box 1010 may be configured to exchange communications with other devices connected to the network 1005, such as the intermediary system 1030 and the advertising system 1040.

The television provider 1010 receives the communication from the set top box 1020 and forwards the communication to the intermediary system 1030 (1112). For example, the television provider 1010 may receive the communication from the network 1005, access contact information for the intermediary system 1030, and send the communication to the intermediary system 1030 based on the accessed contact information. The television provider 1010 may receive the communication from the set top box 1020 using a first communication medium (e.g., a coaxial cable connection) and forward the communication to the intermediary system 1030 using a second, different communication medium (e.g., the Internet). In some implementations, the television provider 1010 may be configured to perform the operations described as being performed by the intermediary system 1030. In these implementations, the television provider 1010 does not forward the communication.

The intermediary system 1030 receives the communication (1114) and enables the participant to participate in the participation television segment (1116). For instance, the intermediary system 1030 may receive the communication from the television provider 1010 over the network 1005 and may process the communication to determine information related to the participant's participation in the participation television segment (e.g., an answer to a question, a contest entry, etc.). Based on communication, the intermediary system 1030 enables the participant to participate in the participation television segment. Enabling the participant to participate in the participation television segment may include exchanging further communications with the participant or using information related to the participant's participation in the participation television segment determined from the communication. Participation in the participation television segment may be conditioned on the participant agreeing to be contacted by an advertiser.

The intermediary system 1030 selects an advertising lead for the participant (1118) and sends the selected advertising lead and options for communicating with an advertiser associated with the advertising lead (1120). For example, the intermediary system 1030 may select an advertising lead for the participant based on demographic information for the participant. In this example, the intermediary system 1030 may compare attributes of multiple advertising leads to demographic information for the participant and select an advertising lead that is most appropriate for the participant (e.g., the advertising lead that the participant is deemed most likely to be interested). The intermediary system 1030 may send options for receiving the advertising lead and communicating with the advertiser. The options for receiving the advertising lead may include a direct mail option, a scheduled return call option, a credit card capture option, and a direct connect option, as discussed above. The intermediary system 1030 may send the selected advertising lead and options for communicating with an advertiser associated with the advertising lead to the television provider 1010 to forward to the set top box 1020. In some implementations, the intermediary system 1030 may bypass the television provider 1010 and send the selected advertising lead and options for communicating with an advertiser associated with the advertising lead directly to the set top box 1020.

The television provider 1010 receives the selected lead and contact options from the intermediary system 1030 and forwards the selected lead and contact options to the set top box 1020 (1122). For example, the television provider 1010 may receive the selected lead and contact options from the network 1005, identify that the set top box 1020 is associated with the selected lead and contact options, and send the selected lead and contact options to the set top box 1020.

The set top box 1020 receives the selected lead and contact options (1124) and displays the selected lead and contact options on the display 1022 (1126). For example, the set top box 1020 may receive a signal including the selected lead and contact options from the network 1005 and may convert the signal into a format used by the display 1022. The set top box 1020 may provide the converted signal to the display 1022 to cause the display 1022 to render a display of the selected lead and contact options. The selected lead and contact options may be displayed as part of a graphical user interface on the display 1022 in a manner in which the participant may place an order associated with the advertising lead or select a contact option using a remote control or another input device recognized by the set top box 1020. The graphical user interface may be displayed over top of television programming.

The set top box 1020 receives user input related to the selected lead and contact options from the participant (1128) and sends a communication to the television provider 1010 based on the user input (1130). The set top box 1020 may receive user input from the participant based on the participant's interaction with a remote control or the participant's interaction with other input controls recognized by the set top box. The user input may be an acceptance of an offer associated with the advertising lead or a selection of a contact option with which the advertiser may contact the participant. Based on the user input, the set top box 1020 sends an electronic communication, over the network 1005, to the television provider 1010. The electronic communication may include information related to the participant and information related to the acceptance of the offer (e.g., a purchase order) or the selection of a contact option. For instance, the electronic communication may include a subscriber identifier that identifies the participant and may include information indicating a contact option selected by the participant and contact information for the participant.

The television provider 1010 receives the communication from the set top box 1020 and forwards the communication to the intermediary system 1030 (1132). For example, the television provider 1010 may receive the communication from the network 1005, access contact information for the intermediary system 1030, and send the communication to the intermediary system 1030 based on the accessed contact information.

The intermediary system 1030 receives the communication (1114). For instance, the intermediary system 1030 may receive the communication from the television provider 1010 over the network 1005 and may process the communication to determine information related to the participant's acceptance of an offer or selection of a contact option.

Based on the communication, the intermediary system 1030 facilitates exchange of information between the participant and the advertiser system 1040 (1136) and the advertiser system 1040 and the participant may exchange information related to a selected advertising lead (1138 and 1140). For example, the intermediary system 1030 may facilitate exchange of information between the participant and the advertiser system 1040 (1136) and the advertiser system 1040 and the participant may exchange information related to a selected advertising lead (1138 and 1140) using techniques similar to those discussed above with respect to reference numerals 530, 532, and 534.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including, by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. In addition, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer system configured to leverage participation television to facilitate advertising, the computer system comprising:
    a communication device configured to exchange communications during a communication session with a participant electronic device of multiple participant electronic devices in response to a participant using the participant electronic device to participate in a participation television segment, the communication session relating to a participation television segment broadcast during television programming;
    a participant identification device configured to automatically, without human intervention, identify the participant based on participant electronic device information received from the participant electronic device with which the participant used to establish the communication session; and
    a processing device configured to:
        use the communication device to enable the participant to participate in the participation television segment broadcast during television programming based on the communication session;
        select an incentive for the participant based on the participation television segment broadcast during television programming, the incentive being associated with an advertiser, each advertiser having different preferred methods of contact therewith;
        present, using the communication session with the participant electronic device, different communication methods with which the participant may communicate with the advertiser to redeem the incentive based on the advertiser's preferred methods of contact;
        receive, using the communication session with the participant electronic device, a selection of at least one of the different communication methods with which the participant may communicate with the advertiser to redeem the incentive; and
        facilitate an exchange of information, using the selected at least one of the different communication methods, between the advertiser and the participant, the exchange of information being related to the incentive.

2. The computer system of claim 1 wherein the processing device is configured to:
    select the incentive by selecting at least one of an offer, a gift, and an advertisement;
    present, using the communication session with the participant electronic device, a direct mail communication method with which the participant receives, from the advertiser, information related to the incentive using direct mail, a scheduled return call communication method with which the participant receives information related to the incentive in a return call from the advertiser at a selected time, a credit card capture communication method with which the participant provides credit card information to enable the advertiser to process the offer using the credit card information, and a direct connect communication method with which the participant is directly connected with the advertiser to receive information related to the incentive using the communication session; and receive, using the communication session with the participant electronic device, a selection of at least one of the direct mail communication method, the scheduled return call communication method, the credit card capture communication method, and the direct connect communication method.

3. The computer system of claim 1 wherein the processing device is configured to:

present, using the established communication session with the participant electronic device, a direct mail communication method with which the participant receives, from the advertiser, information related to the incentive using direct mail;

receive, using the communication session with the participant electronic device, a selection of the direct mail communication method; and facilitate the exchange of information, using the selected at least one of the one or more communication methods, between the advertiser and the participant by:
identifying direct mail contact information for the participant; and
providing the identified direct mail contact information to the advertiser to enable the advertiser to exchange information related to the incentive with the participant by direct mail.

4. The computer system of claim 1 wherein the processing device is configured to:

present, using the communication session with the participant electronic device, a scheduled return call communication method with which the participant receives information related to the incentive in a return call from the advertiser at a selected time;

receive, using the communication session with the participant electronic device, a selection of the scheduled return call communication method and a selection of a time with which the participant wishes to receive the return call; and facilitate the exchange of information, using the selected at least one of the one or more communication methods, between the advertiser and the participant by:
identifying a telephone number for the participant; and
providing, to the advertiser, the identified telephone number for the participant and the time with which the participant wishes to receive the return call to enable the advertiser to exchange information related to the incentive in a return call placed to the identified telephone number for the participant at the time with which the participant wishes to receive the return call.

5. The computer system of claim 1 wherein the processing device is configured to:

select an offer for the participant;

present, using the communication session with the participant electronic device, a credit card capture communication method with which the participant provides credit card information to enable the advertiser to process the offer using the credit card information;

receive, using the communication session with the participant electronic device, a selection of the credit card capture communication method and credit card information); and facilitate the exchange of information, using the selected at least one of the one or more communication methods, between the advertiser and the participant by:
identifying contact information for the participant; and
providing the credit card information and the identified contact information to the advertiser to enable the advertiser to process the offer using the credit card information and provide information related to the processed offer to the participant using the identified contact information.

6. The computer system of claim 1 wherein the processing device is configured to:

determine whether the communication session with the participant electronic device is a telephone call; and conditioned on determining that the communication session with the participant electronic device is a telephone call:
present, using the communication session with the participant electronic device, a direct connect communication method with which the participant is directly connected with the advertiser to receive information related to the incentive using the established telephone call;
receive, using the communication session with the participant electronic device, a selection of the direct connect communication method; and
facilitate the exchange of information, using the selected at least one of the one or more communication methods, between the advertiser and the participant by transferring the established telephone call with the participant to a call center operated by the advertiser to enable the advertiser to exchange information related to the incentive using the transferred telephone call.

7. The computer system of claim 1 wherein the processing device is configured to enable the participant to participate in the participation television segment broadcast during television programming based on the communication session initiated by the participant by:

enabling the participant to participant in an interactive participation television segment that is broadcast during television programming and in which the participant may receive, from the advertiser, a prize, that is different than the incentive.

8. The computer system of claim 1 wherein the processing device is configured to enable the participant to participate in the participation television segment subsequent to receiving, using the communication session with the participant electronic device, the selection of at least one of the one or more communication methods with which the participant may communicate with the advertiser to redeem the incentive.

9. The computer system of claim 1 wherein the processing device is configured to enable the participant to participate in the participation television segment conditioned on the participant agreeing to receive information, from the advertiser, related to the incentive.

10. The computer system of claim 1 further comprising:

a demographic information data store configured to store demographic information associated with potential participants of the participation television segment, wherein:

the processing device is configured to:
access, from the demographic information data store, demographic information associated with the participant based on the identification performed by the participant identification device;

analyze the demographic information associated with the participant; and select the incentive for the participant based on the analysis of the demographic information associated with the participant.

11. The computer system of claim 10 wherein the processing device is configured to:

enable the participant to participate in the participation television segment by receiving an answer, provided by the participant over the communication session with the participant electronic device, to a question presented during the participation television segment broadcast during television programming; and select the incentive for the participant based on the analysis of the demographic information associated with the participant and the participant's answer to the question presented during the participation television segment broadcast during television programming.

12. The computer system of claim 11 wherein the processing device is configured to:

store, in the demographic information data store, the participant's answer to the question presented during, the participation television segment broadcast during television programming; and in response to the participant initiating, using the participant electronic device, a subsequent communication session based on a subsequent participation television segment broadcast during television programming subsequent to the participation television segment:

access, from the demographic information data store, the participant's answer to the question presented during the participation television segment broadcast during television programming; and select a subsequent incentive for the participant for the subsequent participation television segment based on the participant's answer to the question presented during the participation television segment.

13. The computer system of claim 1 wherein the advertiser is an entity other than an entity operating the processing device and the advertiser compensates the entity operating the processing device for facilitating the exchange of information between the advertiser and the participant.

14. The computer system of claim 1 wherein the communication device is configured to establish the communication session with the participant electronic device in response to the participant initiating, using the participant electronic device, the communication session, the communication session occurring while the participation television segment is broadcast during television programming.

15. The computer system of claim 1 wherein the communication device is configured to establish the communication session with at least one of a landline telephone, a cellular telephone, a personal computer, and a personal digital assistant and the communication session includes at least one of a short message service (SMS) communication session, a telephone call, a network communication session, and an instant messaging communication session.

16. The computer system of claim 1 wherein the participation television segment broadcast during television programming is associated with main television programming being, broadcast and includes an actor from the main television programming.

17. The computer system of claim 1 wherein the participation television segment broadcast during television programming is commercial television programming other than main television programming being broadcast.

18. The computer system of claim 1 wherein the participant identification device is configured to automatically identify the participant based on at least one of automatic number identification (ANI) data, dialed number identification service (DNIS) data, a telephone number, and an Internet protocol (IP) address.

19. The computer system of claim 1 wherein the participant identification device is configured to access data from a third party information source and automatically identify a name and address of the participant based on the accessed third party information.

20. A computer-implemented method for leveraging participation television to facilitate advertising, the method comprising:

exchanging communications during a communication session with a participant electronic device of multiple participant electronic devices in response to a participant using the participant electronic device to participate in entertainment programming, the communication session relating to the entertainment programming;

automatically identifying, without human intervention, the participant based on participant electronic device information received from the participant electronic device with which the participant used to establish the communication session;

enabling the participant to participate in the entertainment programming based on the communication session initiated by the participant;

selecting a sponsor for the participant based on the participant's participation in the entertainment programming, each sponsor having different preferred methods of contact;

presenting, using the communication session with the participant electronic device, different communication methods with which the participant may communicate with the sponsor based on the sponsor's preferred methods of contact;

receiving, using the communication session with the participant electronic device, a selection of at least one of the different communication methods with which the. participant may communicate with the sponsor; and facilitating an exchange of information, using the selected at least one of the different communication methods, between the sponsor and the participant.

* * * * *